US008054181B2

(12) United States Patent
Van Wyck Loomis et al.

(10) Patent No.: US 8,054,181 B2
(45) Date of Patent: *Nov. 8, 2011

(54) TERRESTIAL-SIGNAL BASED EXCLUSION ZONE COMPLIANCE

(75) Inventors: Peter Van Wyck Loomis, Sunnyvale, CA (US); James M. Janky, Los Altos, CA (US); Bruce Riter, Los Altos, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/905,064

(22) Filed: Oct. 14, 2010

(65) Prior Publication Data

US 2011/0081020 A1    Apr. 7, 2011

Related U.S. Application Data

(63) Continuation-in-part of application No. 12/100,163, filed on Apr. 9, 2008, now Pat. No. 7,898,409.

(51) Int. Cl.
*G08B 1/08* (2006.01)
(52) U.S. Cl. .......... 340/539.13; 340/539.2; 340/426.15; 340/426.19; 340/985; 340/989; 340/992; 340/993; 342/176; 342/195; 342/464; 342/413
(58) Field of Classification Search ............. 340/539.13, 340/539.2, 426.15, 426.19, 985, 989, 992, 340/993; 342/176, 195, 357.06, 357.12, 342/413, 464; 701/207, 208, 213, 215
See application file for complete search history.

(56) References Cited

U.S. PATENT DOCUMENTS

| 3,796,322 A | 3/1974 | Cording |
| 4,752,012 A | 6/1988 | Juergens |
| 4,857,753 A | 8/1989 | Mewburn-Crook et al. |
| 5,095,531 A | 3/1992 | Ito |
| 5,224,388 A | 7/1993 | Pratt |
| 5,359,542 A | 10/1994 | Pahmeier et al. |
| 5,491,486 A | 2/1996 | Welles, II |
| 5,634,565 A | 6/1997 | Kesage |

(Continued)

FOREIGN PATENT DOCUMENTS

GB    2373086    9/2002

(Continued)

OTHER PUBLICATIONS

"Tower Cranes Anti-Collision and Zone Protection System", www.tac3000.com, (2004),36.

(Continued)

*Primary Examiner* — Tai T Nguyen

(57) ABSTRACT

An exclusion zone compliance circuit comprises a terrestrial radio signal reception component for receiving a terrestrial radio signal comprising a unique identification of a transmission source. A non-volatile memory component of the circuit stores an encrypted data set describing boundaries of an exclusion zone. A navigation data deriving component of the circuit accesses a data set and compares the unique identification with a station identification of the transmission source and the geographic position of the transmission source. The navigation data deriving component derives a geographic position of the exclusion zone compliance circuit and determines whether the exclusion zone compliance circuit is located within an exclusion zone. A data blocking component of the circuit accesses the encrypted data set. A data control component of the exclusion zone compliance circuit blocks output of a signal in response to an indication that the circuit is located within an exclusion zone.

57 Claims, 18 Drawing Sheets

U.S. PATENT DOCUMENTS

| | | |
|---|---|---|
| 5,640,452 A | 6/1997 | Murphy |
| 5,650,770 A | 7/1997 | Schlager et al. |
| 5,752,197 A | 5/1998 | Rautiola |
| 5,859,839 A | 1/1999 | Ahlenius et al. |
| 5,883,817 A | 3/1999 | Chisholm et al. |
| 5,887,269 A | 3/1999 | Brunts et al. |
| 5,890,091 A | 3/1999 | Talbot et al. |
| 5,917,405 A | 6/1999 | Joao |
| 5,987,379 A | 11/1999 | Smith |
| 6,016,117 A | 1/2000 | Nelson, Jr. |
| 6,046,687 A | 4/2000 | Janky |
| 6,064,335 A | 5/2000 | Eschenbach |
| 6,067,031 A | 5/2000 | Janky et al. |
| 6,118,196 A | 9/2000 | Cheng-Yon |
| 6,124,825 A | 9/2000 | Eschenbach |
| 6,144,307 A | 11/2000 | Elliot |
| 6,243,648 B1 | 6/2001 | Kilfeather et al. |
| 6,268,804 B1 | 7/2001 | Janky et al. |
| 6,297,744 B1 | 10/2001 | Baillargeon et al. |
| 6,301,616 B1 | 10/2001 | Pal et al. |
| 6,317,500 B1 | 11/2001 | Murphy |
| 6,320,273 B1 | 11/2001 | Nemec |
| 6,330,149 B1 | 12/2001 | Burrell |
| 6,356,196 B1 | 3/2002 | Wong et al. |
| 6,362,736 B1 | 3/2002 | Gehlot |
| 6,377,165 B1 | 4/2002 | Yoshioka et al. |
| 6,439,515 B1 | 8/2002 | Powers |
| 6,453,237 B1 | 9/2002 | Fuchs et al. |
| 6,459,988 B1 | 10/2002 | Fan et al. |
| 6,480,788 B2 | 11/2002 | Kilfeather et al. |
| 6,505,049 B1 | 1/2003 | Dorenbosch |
| 6,512,465 B2 | 1/2003 | Flick |
| 6,539,307 B1 | 3/2003 | Holden et al. |
| 6,560,536 B1 | 5/2003 | Sullivan et al. |
| 6,609,064 B1 | 8/2003 | Dean |
| 6,650,242 B2 | 11/2003 | Clerk et al. |
| 6,651,000 B2 | 11/2003 | Diggelen et al. |
| 6,657,587 B1 | 12/2003 | Mohan |
| 6,658,336 B2 | 12/2003 | Browne et al. |
| 6,658,349 B2 | 12/2003 | Cline |
| 6,675,095 B1 | 1/2004 | Bird et al. |
| 6,677,938 B1 | 1/2004 | Maynard |
| 6,700,762 B2 | 3/2004 | Underwood et al. |
| 6,725,158 B1 | 4/2004 | Sullivan et al. |
| 6,801,853 B2 | 10/2004 | Workman |
| 6,804,602 B2 | 10/2004 | Impson et al. |
| 6,826,452 B1 | 11/2004 | Holland et al. |
| 6,829,535 B2 | 12/2004 | Diggelen et al. |
| 6,843,383 B2 | 1/2005 | Schneider et al. |
| 6,864,789 B2 | 3/2005 | Wolfe |
| 6,865,169 B1 | 3/2005 | Quayle et al. |
| 6,934,629 B1 | 8/2005 | Chisholm et al. |
| 6,948,066 B2 | 9/2005 | Hind et al. |
| 6,970,801 B2 | 11/2005 | Mann |
| 6,981,423 B1 | 1/2006 | Discenzo |
| 7,020,555 B1 | 3/2006 | Janky et al. |
| 7,032,763 B1 | 4/2006 | Zakula, Sr. et al. |
| 7,034,683 B2 | 4/2006 | Ghazarian |
| 7,050,907 B1 | 5/2006 | Janky et al. |
| 7,070,060 B1 | 7/2006 | Feider et al. |
| 7,095,368 B1 | 8/2006 | Diggelen |
| 7,095,370 B1 | 8/2006 | Diggelen et al. |
| 7,158,883 B2 | 1/2007 | Fuchs et al. |
| 7,194,620 B1 | 3/2007 | Hayes |
| 7,212,120 B2 | 5/2007 | Gudat |
| 7,289,875 B2 | 10/2007 | Recktenwald et al. |
| 7,295,855 B1 | 11/2007 | Larsson et al. |
| 7,298,319 B2 | 11/2007 | Han et al. |
| 7,308,114 B2 | 12/2007 | Takehara et al. |
| 7,313,476 B2 | 12/2007 | Nichols et al. |
| 7,324,921 B2 | 1/2008 | Sugahara et al. |
| 7,344,037 B1 | 3/2008 | Zakula et al. |
| 7,367,464 B1 | 5/2008 | Agostini et al. |
| 7,398,153 B2 | 7/2008 | Workman et al. |
| 7,548,200 B2 | 6/2009 | Garin et al. |
| 7,548,816 B2 | 6/2009 | Riben et al. |
| 7,639,181 B2 | 12/2009 | Wang et al. |
| 7,667,642 B1 | 2/2010 | Frericks et al. |
| 7,710,317 B2 | 5/2010 | Cheng et al. |
| 7,719,416 B2 | 5/2010 | Arms et al. |
| 7,031,883 B1 | 4/2011 | Lee |
| 2002/0070856 A1 | 6/2002 | Wolfe |
| 2002/0082036 A1 | 6/2002 | Ida et al. |
| 2002/0117609 A1 | 8/2002 | Thibault et al. |
| 2002/0142788 A1 | 10/2002 | Chawla et al. |
| 2003/0045314 A1 | 3/2003 | Burgan et al. |
| 2003/0064744 A1 | 4/2003 | Zhang et al. |
| 2003/0071899 A1 | 4/2003 | Joao |
| 2003/0073435 A1 | 4/2003 | Thompson et al. |
| 2003/0119445 A1 | 6/2003 | Bromham et al. |
| 2004/0024522 A1* | 2/2004 | Walker et al. .................. 701/210 |
| 2004/0034470 A1 | 2/2004 | Workman |
| 2004/0044911 A1* | 3/2004 | Takada et al. .................. 713/201 |
| 2004/0078594 A1 | 4/2004 | Scott |
| 2004/0196182 A1 | 10/2004 | Unnold |
| 2004/0219927 A1 | 11/2004 | Sumner |
| 2004/0243285 A1* | 12/2004 | Gounder ........................... 701/1 |
| 2005/0030175 A1 | 2/2005 | Wolfe |
| 2005/0055161 A1 | 3/2005 | Kalis et al. |
| 2005/0095985 A1 | 5/2005 | Hafeoz |
| 2005/0103738 A1 | 5/2005 | Recktenwald et al. |
| 2005/0116105 A1 | 6/2005 | Munk et al. |
| 2005/0137742 A1 | 6/2005 | Goodman et al. |
| 2005/0147062 A1 | 7/2005 | Khouaja et al. |
| 2005/0154904 A1 | 7/2005 | Bhargav et al. |
| 2005/0179541 A1 | 8/2005 | Wolfe |
| 2005/0242052 A1 | 11/2005 | O'Connor et al. |
| 2005/0248444 A1 | 11/2005 | Joao |
| 2006/0027677 A1 | 2/2006 | Abts |
| 2006/0243056 A1 | 11/2006 | Sundermeyer et al. |
| 2007/0005244 A1 | 1/2007 | Nadkarni |
| 2007/0174467 A1 | 7/2007 | Ballou et al. |
| 2007/0255498 A1 | 11/2007 | McDaniel et al. |
| 2008/0014965 A1 | 1/2008 | Dennison et al. |
| 2008/0036617 A1 | 2/2008 | Arms et al. |
| 2008/0086685 A1 | 4/2008 | Janky et al. |
| 2008/0100977 A1 | 5/2008 | Shreiner et al. |
| 2008/0122234 A1 | 5/2008 | Alioto et al. |
| 2009/0009389 A1 | 1/2009 | Mattos |
| 2009/0109049 A1 | 4/2009 | Frederick et al. |
| 2009/0322890 A1 | 12/2009 | Bocking et al. |
| 2010/0100338 A1 | 4/2010 | Vik et al. |

FOREIGN PATENT DOCUMENTS

| | | |
|---|---|---|
| JP | 05286692 | 11/1993 |
| JP | 8240653 | 9/1996 |
| JP | 2000/048283 | 2/2000 |
| JP | 2000/249752 | 9/2000 |
| JP | 2002/197593 | 7/2002 |
| JP | 2002/197595 | 7/2002 |
| JP | 2002/217811 | 8/2002 |
| WO | WO-02/35492 | 5/2002 |
| WO | WO-03/007261 | 1/2003 |
| WO | WO-2004/017272 | 2/2004 |
| WO | WO-2004/083888 | 9/2004 |
| WO | WO-2005/017846 | 2/2005 |
| WO | WO-2009/084820 | 7/2009 |

OTHER PUBLICATIONS

"Anti-Collision Systems A Clash of Cultures", http://www.cranestodaymagazine.com/story.asp?sectionCode=66&storyCode=2043070, (Mar. 21, 2007), 6.

Abderrahim, M. et al., "A Mechatronics Security System for the Construction Site", www.elsevier.com/locate/autcon, (Sep. 7, 2004),460-466.

"Highland Man's Invention Success With Dewalt", http://www.heraldextra.com/content/view/195674/4/, (Oct. 8, 2006),3.

\* cited by examiner

800

BEGIN

RECEIVING A TERRESTRIAL RADIO SIGNAL, COMPRISING A UNIQUE IDENTIFICATION OF A TRANSMISSION SOURCE OF THE TERRESTRIAL RADIO SIGNAL, WITH A TERRESTRIAL RADIO SIGNAL RECEPTION COMPONENT OF AN EXCLUSION ZONE COMPLIANCE CIRCUIT
801

ACCESSING A DATA SET COMPRISING A STATION IDENTIFICATION OF THE TRANSMISSION SOURCE AND A KNOWN GEOGRAPHIC POSITION OF THE TRANSMISSION SOURCE AND COMPARING THE RECEIVED UNIQUE IDENTIFICATION OF THE TRANSMISSION SOURCE WITH THE STATION IDENTIFICATION OF THE TRANSMISSION SOURCE STORED IN THE DATA SET
802

DERIVING A GEOGRAPHIC POSITION OF THE EXCLUSION ZONE COMPLIANCE CIRCUIT BASED UPON THE KNOWN GEOGRAPHIC POSITION OF THE TRANSMISSION SOURCE
803

UTILIZING A NON-VOLATILE MEMORY COMPONENT TO STORE AN ENCRYPTED DATA SET DESCRIBING BOUNDARIES OF AN EXCLUSION ZONE
804

UTILIZING A DATA BLOCKING COMPONENT TO CONTROL ACCESS OF THE ENCRYPTED DATA SET
805

UTILIZING A DATA CONTROL COMPONENT TO BLOCK THE OUTPUT OF A SIGNAL FROM THE EXCLUSION ZONE COMPLIANCE CIRCUIT IN RESPONSE TO AN INDICATION THAT THE EXCLUSION ZONE COMPLIANCE CIRCUIT IS LOCATED WITHIN AN EXCLUSION ZONE
806

END

FIG. 8 ly patent application Ser. No. 12/100,163,

TERRESTIAL-SIGNAL BASED EXCLUSION ZONE COMPLIANCE

RELATED U.S. APPLICATION

The present application is a Continuation-in-Part Application of U.S. utility patent application Ser. No. 12/100,163, filed Apr. 9, 2008 now U.S. Pat. No. 7,898,409 by Peter Van Wyck Loomis, James M. Janky, and Bruce D. Ritter entitled A Circuit for Exclusion Zone Compliance, which is assigned to the assignee of the present technology and which is incorporated herein by reference in its entirety.

BACKGROUND

Geographic data is increasingly used to provide geo-spatial data to a wide variety of business, government, and academic applications. Increasingly, remote Global Navigation Satellite System (GNSS) receivers are used to collect position data in a wide variety of electronic devices. For example, the GNSS receivers are now incorporated into cellular telephones, personal digital assistants (PDAs), dedicated navigation devices, surveying instruments, construction equipment, etc. Additionally, GNSS receivers are often used to monitor the geographic position of high value items such as vehicles, laptop computer systems, or even packages which are being shipped. Thus, there are a wide variety of commercially available devices which utilize satellite navigation technology.

However, satellite navigation systems may be considered "dual-use" technology which means that the satellite navigation system may be used in a commercial, or military, application. As an example, a group or nation may convert a commercial satellite navigation device to a military purpose as a low-cost alternative to acquiring a military satellite navigation device with a dedicated military function. This also subverts monitoring of weapons proliferation, especially the proliferation of precision guided weapons.

Alternatively, resale of commercial products having satellite navigation components is also a problem for countries with laws prohibiting such resale. In addition, a satellite navigation product which is intended for one market at a first cost may be resold for a profit in another market at a higher cost. This can undercut the profits of the company which originally sold the product and subvert the law of the country of manufacture, or where the operative enterprise may be domiciled.

BRIEF DESCRIPTION OF THE DRAWINGS

The accompanying drawings, which are incorporated in and form a part of this specification, illustrate embodiments of the present technology and, together with the description, serve to explain the principles of the technology. Unless specifically noted, the drawings referred to in this description should be understood as not being drawn to scale.

FIG. 8 is a flowchart of a method for applying exclusion zone compliance in accordance with an embodiment of the present technology.

DESCRIPTION OF EMBODIMENTS

Reference will now be made in detail to various embodiments, examples of which are illustrated in the accompanying drawings. While the subject matter will be described in conjunction with these embodiments, it will be understood that they are not intended to limit the subject matter to these embodiments. Furthermore, in the following description, numerous specific details are set forth in order to provide a thorough understanding of the subject matter. In other instances, well-known methods, procedures, objects, and circuits have not been described in detail as not to unnecessarily obscure aspects of the subject matter.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing terms such as "receiving," "accessing," "using," "generating," "deriving," "utilizing," "disabling," "storing," "determining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Figure 1A:
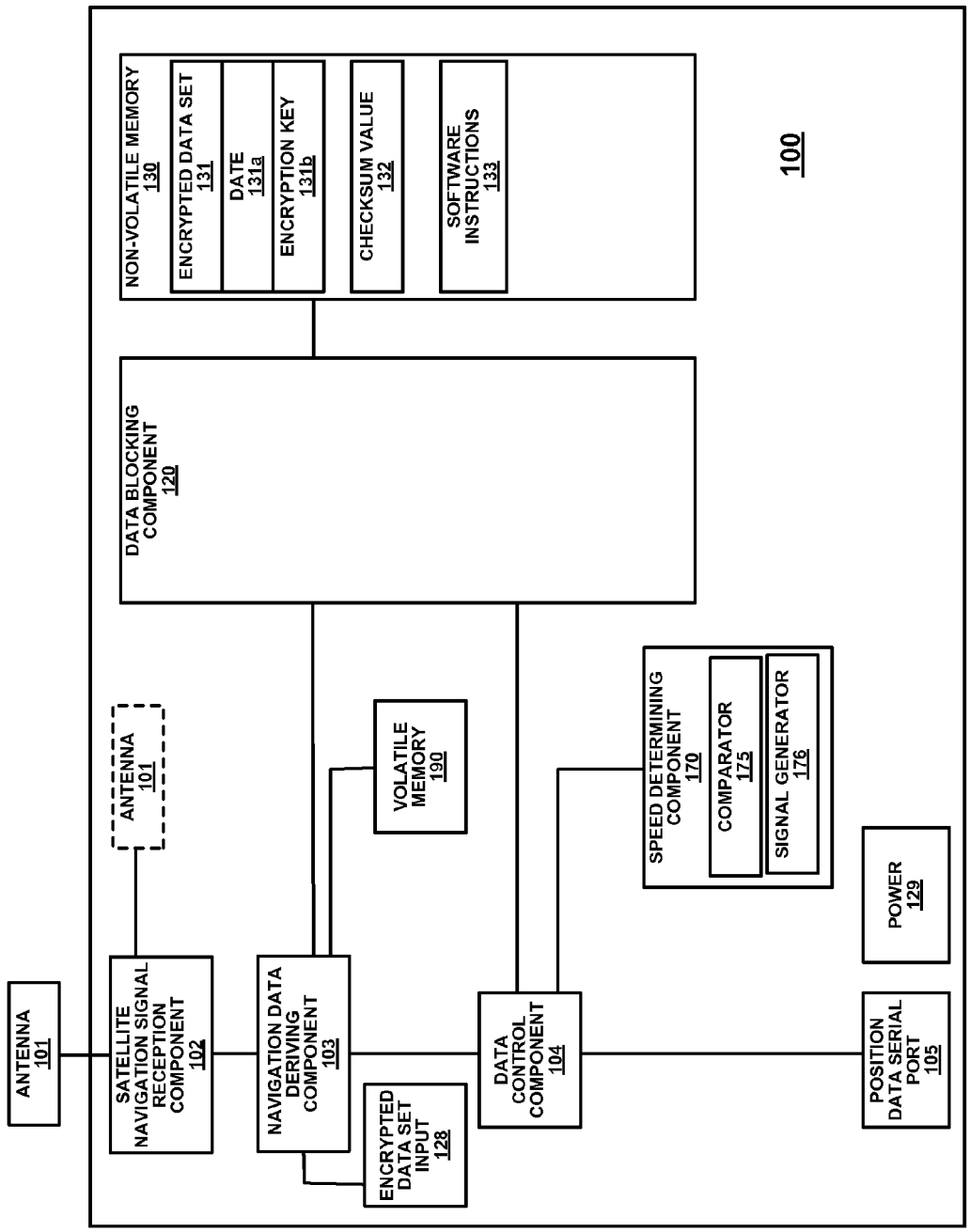
FIG. 1A is a block diagram of a circuit for exclusion zone compliance in accordance with embodiments of the present technology.

FIG. 1A is a block diagram of a circuit 100 for exclusion zone compliance in accordance with embodiments of the present technology. In embodiments of the present technology, circuit 100 may be a component of a dedicated position determining device such as a surveying receiver capable of high precision and high accuracy positioning, a personal navigation system, an in-vehicle navigation system for use in personal driving, or for use in guiding a farm vehicle or a military vehicle, a tracking device, a specialized guidance device whereby a guidance vector is created between the current location and a desired location, or the like. In other embodiments, circuit 100 is not a component of a dedicated position determining device, but is a component which provides position determining functionality for an electronic device. For example, cellular telephones, PDAs, and automobiles are increasingly equipped with some form of GNSS capability in order to provide a user with geographic positioning and position-based information.

In one embodiment, circuit 100 comprises a satellite navigation signal reception component 102 which is communicatively coupled with an antenna 101. It is noted that while antenna 101 is shown disposed outside of circuit 100, it can also comprise a component of circuit 100 in an embodiment of the present technology. In one embodiment, satellite navigation signal reception component 102 comprises a Global Navigation Satellite System (GNSS) baseband processor and Radio Frequency (RF) front-end. GNSS RF front-end components are used for receiving at least one signal from at least one GNSS satellite and for converting that signal into an intermediate frequency signal. GNSS baseband processors are used to sample the intermediate frequency signals and for acquiring and tracking the signal received from the GNSS satellites in view. The GNSS baseband processor also is used to derive timing measurements from the clock offset component of the position fix solution, obtained by processing the intermediate frequency signal from the GNSS RF front-end. The GNSS baseband processor also can determine pseudoranges, signal phases, and Doppler frequency shift data from processing the intermediate frequency signal. These basic functions are well known in the Global Positioning System (GPS) and GNSS arts.

Circuit 100 further comprises a navigation data deriving component 103 which is communicatively coupled with satellite navigation signal reception component 102 and with a position data serial port 105 via a data control component 104. In embodiments of the present technology, navigation data deriving component 103 is for determining the geographic position of the antenna 101 and the associated circuit 100 based upon the data from satellite navigation signal reception component 102. In one embodiment, circuit 100 comprises a non-volatile memory 130 for persistent storage of digital information and instructions for circuit 100. In one embodiment, non-volatile memory 130 is used for storing the operating system for circuit 100. In one embodiment, this may include, but is not limited to, instructions and data for satellite navigation reception component 102, navigation data deriving component 103, data control component 104, data blocking component 120, microprocessor system 154 of FIG. 1B, and navigation processor 158 of FIG. 1B.

In embodiments of the present technology, data control component 104 is for blocking the output of a signal from navigation data deriving component 103 in response to determining that circuit 100 is located within an exclusion zone. In one embodiment, navigation data deriving component 103 compares the current geographic position of circuit 100 against a data set (131) of coordinates of at least one exclusion zone. In another embodiment, data control component 104 receives the current geographic position of circuit 100 from navigation data deriving component 103 and accesses the encrypted data set 131 for the coordinates defining the exclusion zone(s). Data control component 104 then determines whether circuit 100 is currently located within an exclusion zone. For the purposes of the present technology, an exclusion zone is a geographic region in which GNSS positioning data is not to be made accessible, outside the confines of the packaged circuit of circuit 100. In embodiments of the present technology, if it is determined that circuit 100 is currently located within an exclusion zone, navigation data deriving component 103 generates a signal to data control component 104 which indicates that circuit 100 is currently located within an exclusion zone.

In response to an indication that circuit 100 is currently located within an exclusion zone, data control component 104 blocks the output of a signal from navigation data deriving component 103. In embodiments of the present technology, data control component 104 can block the output of satellite navigation signals received from antenna 101, unprocessed position data such as timing data, pseudoranges, signal phases, Doppler signal shifts, a control signal, or a geographic position derived by navigation data deriving component 103. In so doing, circuit 100 is no longer usable for supplying geographic position data while it is located within an exclusion zone.

In one embodiment, data control component 104 will permanently block the output of a signal from navigation data deriving component 103 in response to an indication that circuit 100 is located within an exclusion zone. For example in one embodiment, data control component 104 is configured such that it cannot be reset once it blocks the output of a signal from navigation data deriving component 103. In other words, once data control component 104 blocks the output of a signal from navigation data deriving component 103, it cannot be reset to later facilitate conveying a signal from navigation data deriving component 103. Thus, once it has been determined that circuit 100 is within an exclusion zone, it is permanently disabled and cannot be used to receive navigation signals, or to output data used for determining a geographic position. In another embodiment, data control component 104 is configured to output a signal to another device (e.g., circuit 300 of FIG. 3) which will disable circuit 100, or otherwise prevent it from outputting a signal. In another embodiment, data control component 104 is configured to output a signal to non-volatile memory 130 such that it can no longer output the data and instructions necessary for circuit 100 to function.

In another embodiment, data control component 104 only blocks the output of a signal from navigation data deriving component 103 while circuit 100 is currently located in an exclusion zone. In other words, if circuit 100 is moved from an exclusion zone to an area outside of the exclusion zone, data control component 104 will permit navigation data deriving component 103 to output a signal via position data serial port 105. It is noted that data control component 104 may be implemented within navigation data deriving component 103 in one embodiment of the present technology.

In one embodiment, encrypted data set 131 is stored in a non-volatile memory 130. In one embodiment, non-volatile memory 130 comprises a read-only memory (ROM) device. In other words, encrypted data set 131 is permanently stored in non-volatile memory 130 and cannot be updated. In another embodiment, non-volatile memory 130 comprises a programmable memory device such as a Flash memory or the like. Thus, in one embodiment, encrypted data set 131 can be updated to include additional exclusion zones as they are identified, or to remove exclusion zones as desired.

In the embodiment of FIG. 1A, navigation data deriving component 103 and data control component 104 are communicatively coupled with non-volatile memory 130 via a data blocking component 120. Data blocking component 120 controls the accessing of encrypted data set 131 from non-volatile memory 130. As shown in FIG. 1C, data blocking component 120 comprises a checksum determining component 121, and a checksum comparing component 122.

In one embodiment, checksum determining component 121 is for determining the checksum value 121a of encrypted data set 131. This checksum value 121a is then passed to checksum comparing component 122 which compares the checksum value 121a with a checksum value 132 stored in non-volatile memory 130. In one embodiment, checksum value 132 is a checksum value of encrypted data set 131 when it is first stored in non-volatile memory 130. If encrypted data set 131 is then altered after it has been stored in non-volatile memory 130, checksum value 121a, as determined by checksum determining component 121, will no longer match the checksum value 132. Thus, checksum comparing component 122 can determine if encrypted data set 131 has been altered after it has been stored in non-volatile memory 130.

In one embodiment of the present technology, if checksum comparing component 122 determines that checksum value 121a does not match the checksum value 132, data blocking component 120 will prevent accessing of encrypted data set 131 by navigation data deriving component 103 and/or data control component 104. In one embodiment, if data control component 104 cannot access encrypted data set 131, it automatically blocks the output of a signal from navigation data deriving component 103. In so doing, embodiments of the present technology can authenticate the integrity of encrypted data set 131 and prevent alteration of the exclusion zones. Thus, if an entity tries to circumvent the exclusion zone features of circuit 100 by changing the coordinates of one or more exclusion zones, data blocking component 120 renders circuit 100 unusable because necessary data for determining the geographic position of circuit 100 is not accessible.

Figure 1B:
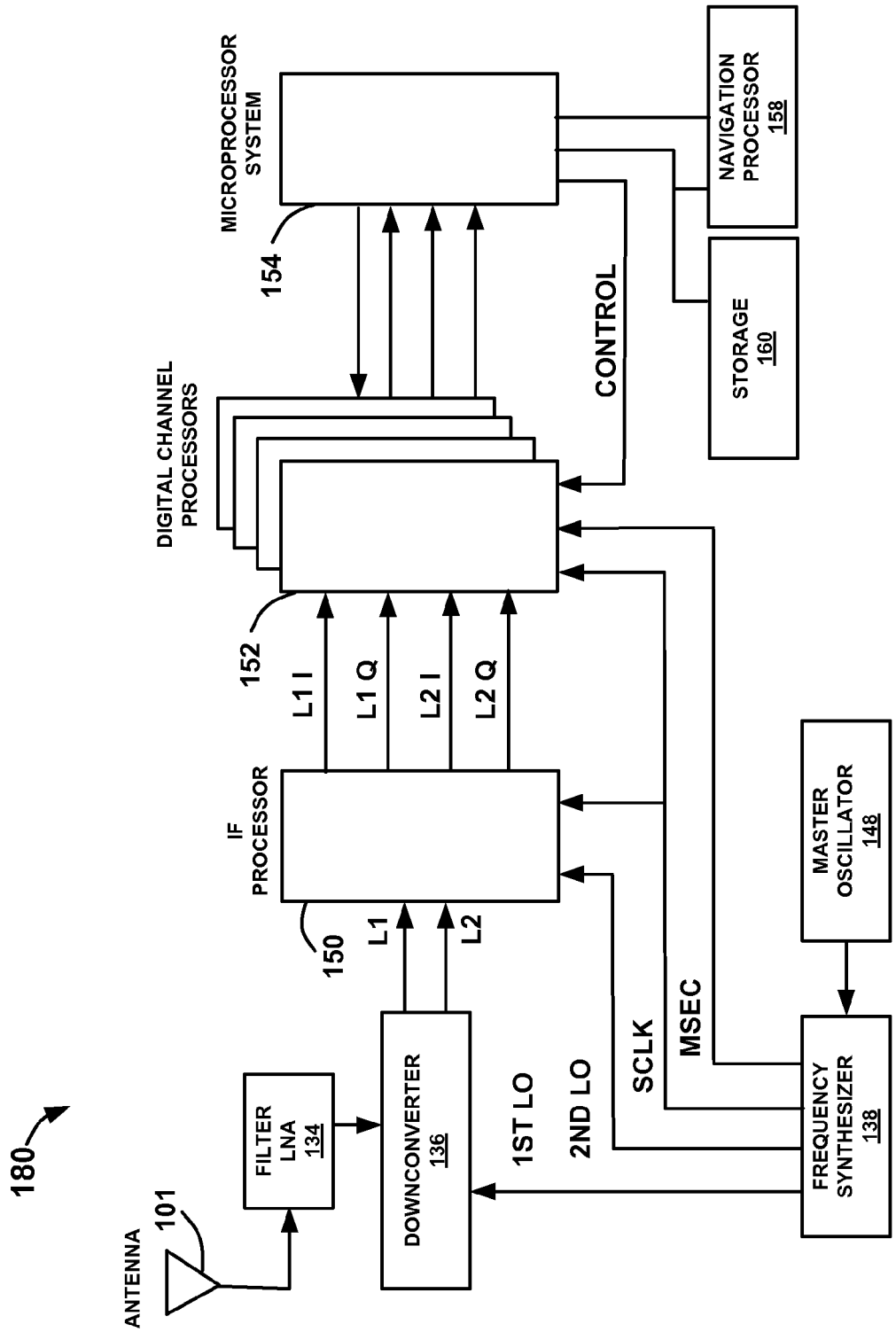
FIG. 1B is a block diagram of an example GNSS receiver which may be used in accordance with an embodiment of the present technology.
Figure 1C:
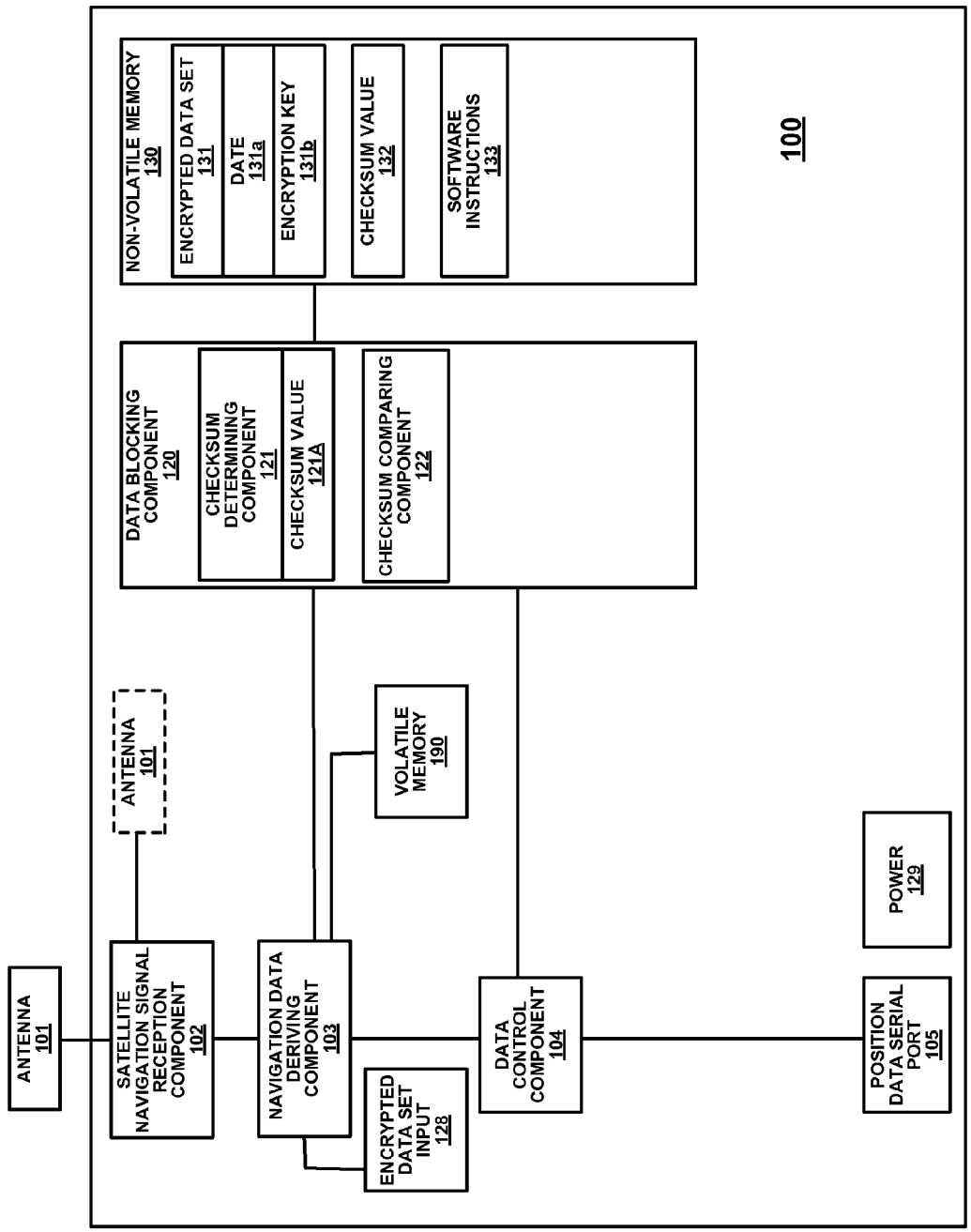
FIG. 1C is a block diagram of a circuit for exclusion zone compliance in accordance with embodiments of the present technology.
Figure 1D:
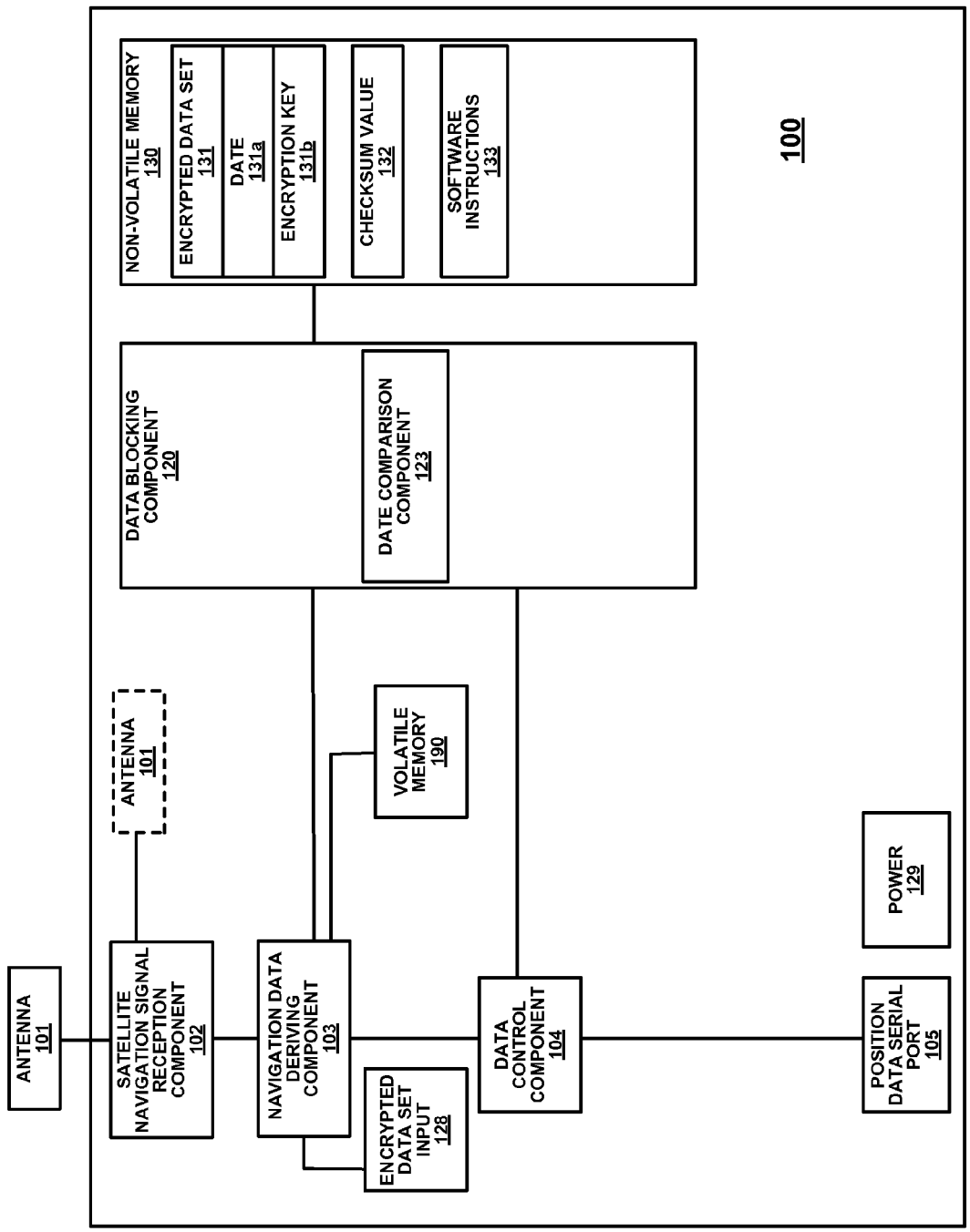
FIG. 1D is a block diagram of a circuit for exclusion zone compliance in accordance with embodiments of the present technology.

In the embodiment of FIG. 1D, data blocking component 120 comprises a date comparison component 123 for comparing a date associated with encrypted data set 131 with a second date corresponding to a valid data set. In one embodiment of the present technology, a date 131a is associated with encrypted data set 131 which facilitates determining whether a valid, or current, data set is used to define exclusion zones. It is noted that date 131a can comprise the current day, week, month, and year as well as a time of day (e.g., 1 PM Eastern Standard Time) in one embodiment. In one embodiment, encrypted data set 131 is required to be periodically updated in order to reflect any changes to the coordinates of the exclusion zones. As described above, this may include adding more exclusion zones, or removing some exclusion zones. In one embodiment, an updated data set may be received via a wireless network. In another embodiment, an updated data set may require that a removable data storage medium (e.g., a Smart Card, Universal Serial Bus (USB) drive, SmartMedia card, MultiMedia card, MicroDrive™ device, CompactFlash™ device, MemoryStick device, SecureDigital card, optical data storage device, or the like) is communicatively coupled with navigation data deriving component 103 via encrypted data set input 128.

In one embodiment, date comparison component 123 can be used to prevent the output of time sensitive data via circuit 100. For example, an exclusion zone list may only be valid until a certain date. In one embodiment, the exclusion zone list is encrypted and stored in non-volatile memory 130 as an encrypted data set (e.g., encrypted data set 131). In one embodiment, date comparison component 123 compares the current time and date with a date attribute of the encrypted data set 131 which describes when the encrypted data set 131 expires, or is no longer to be made available. In one embodiment, when date comparison component 123 determines that the encrypted data set 131 has expired, it will generate a signal to data control component 104. In response, data control component 104 blocks the output of the encrypted data set 131. In one embodiment, date comparison component 123 flags the encrypted data set 131 which marks it as an expired data set.

In one embodiment of the present technology, date comparison component 123 determines whether date 131a corresponds with a valid data set. For example, if there is a requirement to update encrypted data set 131 monthly, date comparison component 123 determines whether encrypted data set 131 has been updated within the last month. In one embodiment, if date comparison component 123 determines that encrypted data set 131 is not a valid data set, data blocking component 120 will prevent accessing of encrypted data set 131 by navigation data deriving component 103 and/or data control component 104. Again, this will prevent the operation of circuit 100. Thus, if an entity tries to circumvent an exclusion zone restriction by using an older data set, circuit 100 will be rendered unusable. Additionally, data blocking component 120 may also prevent accessing of software instructions 133 by navigation data deriving component 103 and/or data control component 104 as well. In embodiments of the present technology, software instructions 133 may comprise an almanac which helps navigation data deriving component 103 determine where GNSS satellites are in their respective orbits. Software instructions 133 may also comprise an encryption/decryption algorithm used to encrypt and/or decrypt encrypted data set 131.

Figure 1E:
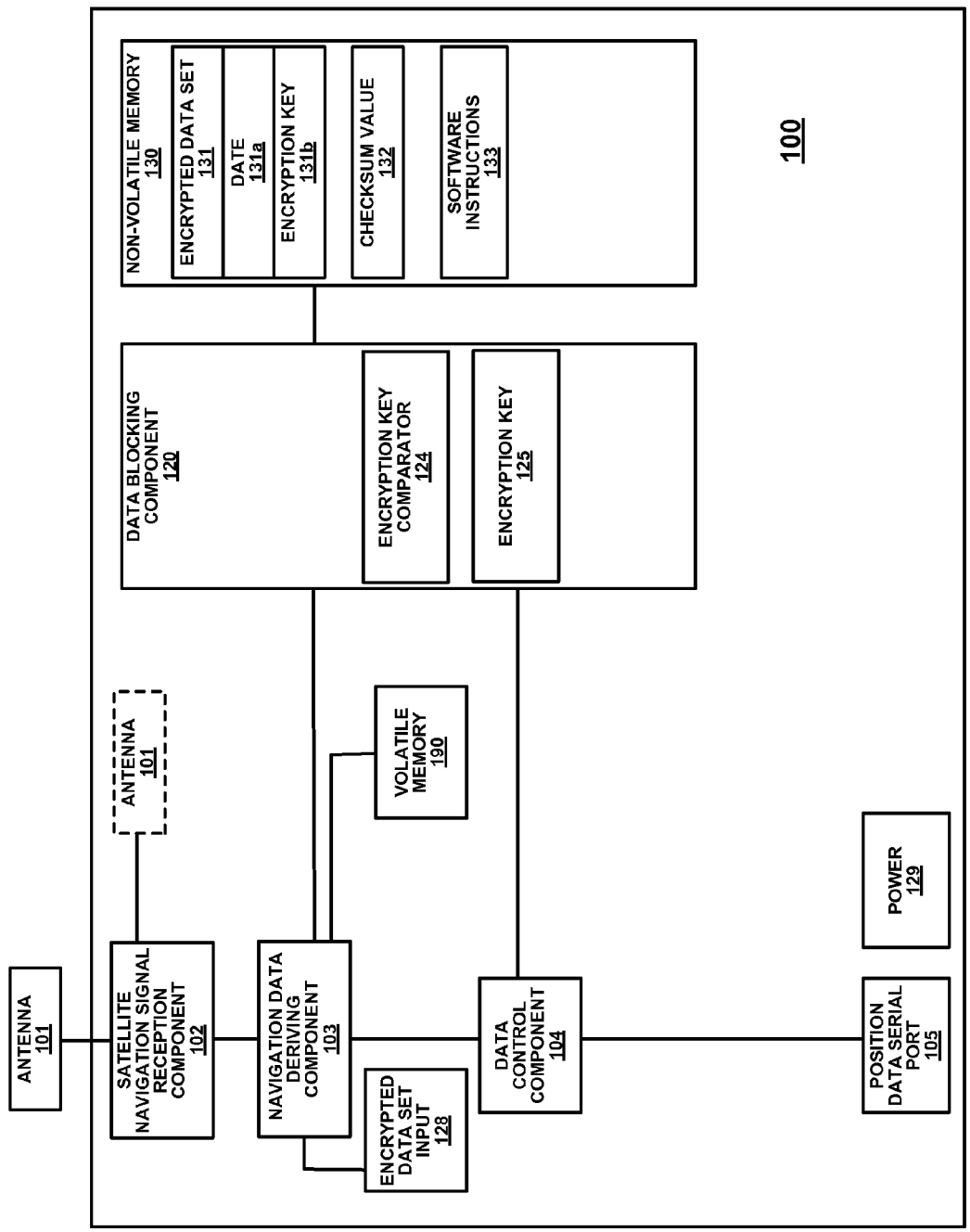
FIG. 1E is a block diagram of a circuit for exclusion zone compliance in accordance with embodiments of the present technology.

In FIG. 1E, circuit 100 further comprises an encryption key comparator 124 for comparing a stored encryption key 125 with an encryption key 131b associated with encrypted data set 131. In one embodiment, encrypted data set 131 is encrypted using standard encryption techniques, e.g., Message Digest algorithm 5 (MD-5), Secure Hash Algorithms (SHA), etc. In one embodiment, a private key (e.g., encryption key 125) is loaded into circuit 100 during production. Thus, encryption key 125 is inaccessible to a user of circuit 100. In one embodiment, encryption key 125 may comprise a portion of a larger encrypted sequence stored in circuit 100. For example, a 64-bit sequence may be stored. However, encryption key 125 may only comprise a 32-bit sequence within that 64-bit sequence. This makes it harder for an end user to determine what portion of the stored sequence is the actual encryption key 125. It is noted that encryption key 125 may be stored in navigation data deriving component 103, non-volatile memory 130, or volatile memory 190 in embodiments of the present technology. It is further noted the volatile memory 190 can also be used to store data and instructions for navigation data deriving component 103 and data control component 104.

In one embodiment of the present technology, encryption key comparator 124 compares stored encryption key 125 with encryption key 131*b* prior to loading encrypted data set 131 into non-volatile memory 130. In one embodiment, encryption key 131*b* is used to encrypt encrypted data set 131 prior to it being loaded into non-volatile memory 130 via encrypted data set input 128. In one embodiment, stored encryption key 125 and encryption key 131*b* are both encrypted themselves. In one embodiment, if stored encryption key 125 does not match encryption key 131*b* which is within encrypted data set 131, data blocking component 120 prevents the loading of encrypted data set 131 into non-volatile memory 130. If stored encryption key 125 does match encryption key 131*b* which is within encrypted data set 131, encryption key 125 is used to decrypt encrypted data set 131 prior to its being accessed by navigation data deriving component 103 and/or data control component 104. This facilitates authenticating encrypted data set 131 prior to loading it into non-volatile memory 130.

Figure 1F:
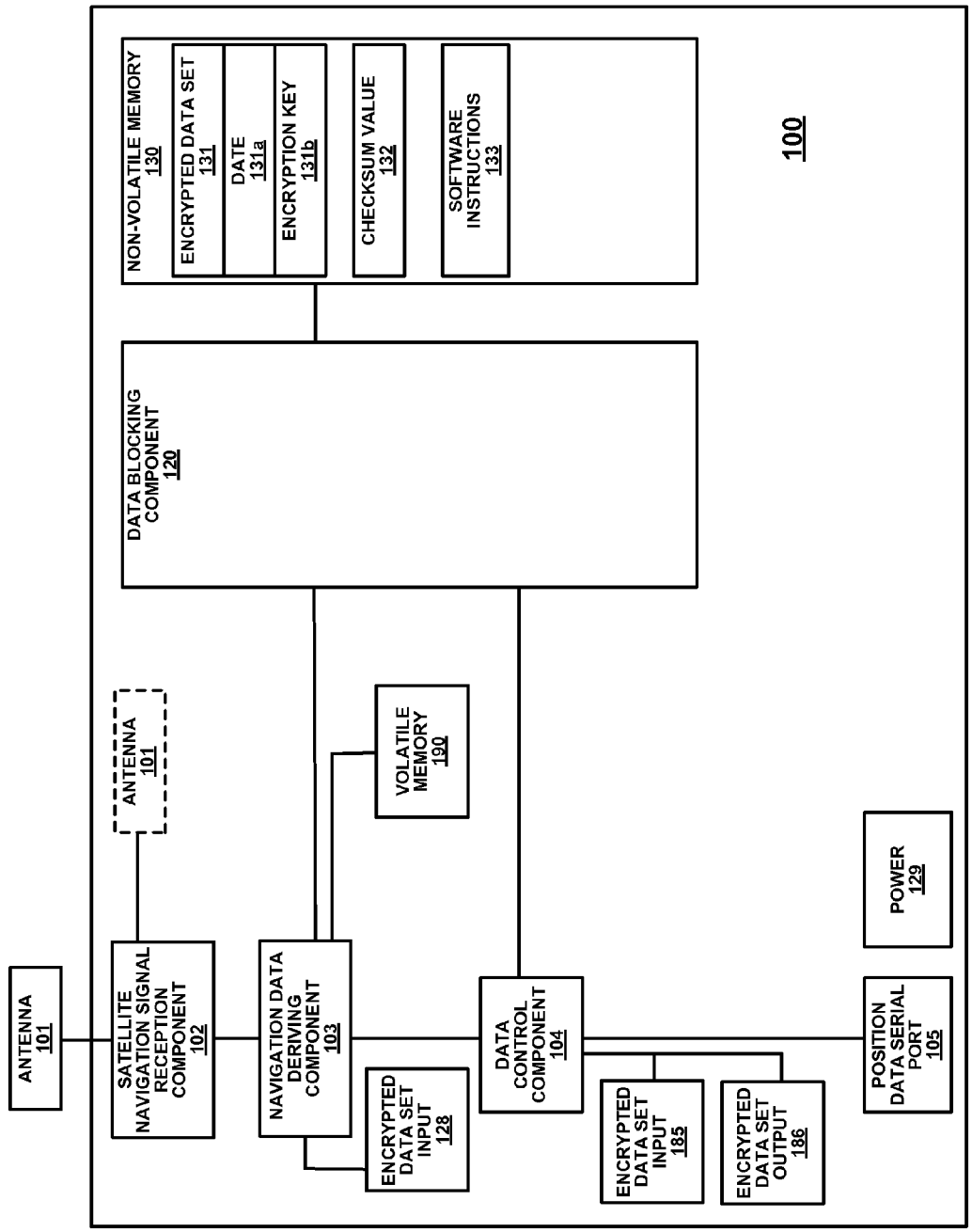
FIG. 1F is a block diagram of a circuit for exclusion zone compliance in accordance with embodiments of the present technology.

In FIG. 1F, circuit comprises an encrypted data set input 185 and an encrypted data set output 186 which are communicatively coupled via data control component 104. In one embodiment, circuit 100 can be used to control the output of data from a device to which circuit is communicatively coupled. For example, circuit 100 can be communicatively coupled with a cellular telephone, a handheld computer system such as a Personal Digital Assistant (PDA), a laptop computer system, a general purpose computer system, or other electronic device. In one embodiment, data from a device to which circuit 100 is coupled passes through circuit 100 prior to its output. Thus, data cannot be displayed, downloaded, shared, copied, or accessed unless it passes via circuit 100 first. In one embodiment, circuit 100 can be used to control the output of data from an electronic device to which it is coupled. For example, in one embodiment circuit 100 can be used to prevent the output of data based upon the geographic position determined by navigation data deriving component 103. In other words, if it is determined that circuit 100 is within an exclusion zone, the output of data from circuit 100 will be blocked by data control component 104.

In one embodiment, the data blocked by data control component 104 comprises, but is not limited to, navigation data from navigation data deriving component 103, data stored in volatile memory 190, data stored in non-volatile memory 130, or data which is input to circuit 100 via encrypted data set input 165. In one embodiment, the encryption key used to decrypt data input from encrypted data input 185 is stored in circuit 100. As described above, circuit can be used to decrypt an encrypted data set determining whether a stored data set has been altered subsequent to its being stored in circuit 100. It is noted that there is no requirement for data input via encrypted data set input 165 to be encrypted in one embodiment. As will be explained in greater detail below, the data described above may be blocked from being output by circuit 100 based upon the date, or current time, or based upon the speed at which circuit 100 is moving, or a combination thereof in one embodiment. The use of date, time, and/or speed to determine whether data is output by circuit 100 can be used in conjunction with a geographic position of circuit 100 in one embodiment.

Figure 1G:
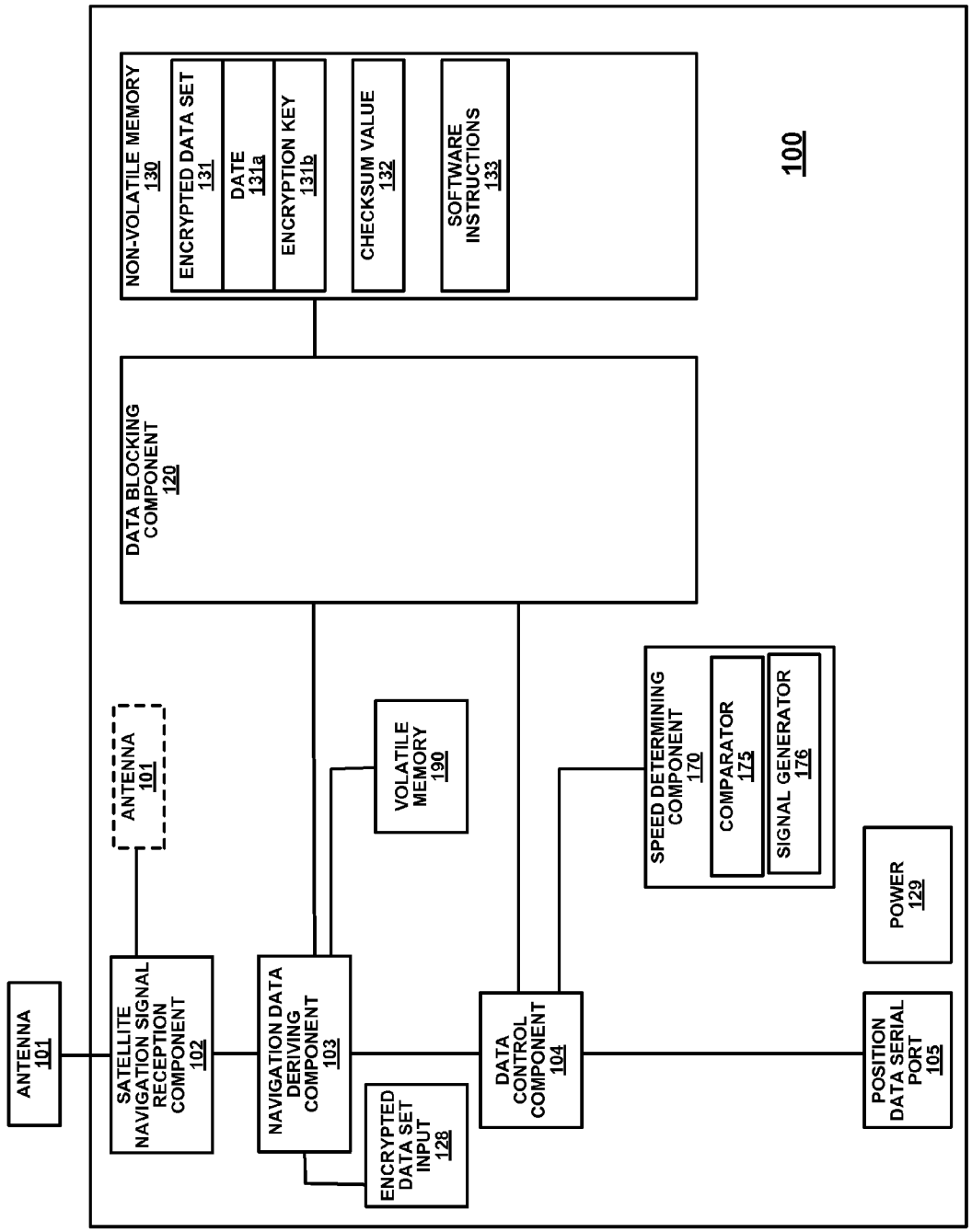
FIG. 1G is a block diagram of a circuit for exclusion zone compliance in accordance with embodiments of the present technology.

In FIG. 1G, circuit 100 comprises a speed determining component 170. In one embodiment, speed determining component 170 is configured to determine the speed of circuit 100. In one embodiment, speed determining component 170 receives position data from navigation data deriving component 103 and determines if circuit is exceeding a pre-determined speed threshold. For example, in one embodiment speed determining component 170 can receive successive measurements of the geographic position of circuit 100 from navigation data deriving component 103. Based upon the time interval of the successive measurements of geographic position, speed determining component 170 can then determine the speed of circuit 100. It is noted that other methods may be used by speed determining component 170 as well. For example, speed determining component 170 may also be configured to determine the speed of circuit 100 based upon an analysis of the Doppler shift of received satellite navigation signals due to motion of circuit 100. The speed of circuit 100 is compared with a pre-determined speed threshold to determine if circuit 100 is moving, or is moving faster than the speed threshold. It is noted that the speed threshold 390 can be set to comply with export control regulations. For example, one standard for export control of sensitive technology does not permit the export of a satellite navigation device which is capable of providing navigation information at speeds in excess of 600 meters/second. Thus, in one embodiment the speed threshold 390 is set at a minimum of 600 meters/second. It is noted that the speed threshold 390 can be set at a limit lower than 600 meters/second. For example, if speed threshold 390 is set at a speed of 8 miles per hour, it may be assumed that circuit 100 is disposed in a moving vehicle when its speed exceeds 8 miles per hour. Alternatively, it may be assumed that the user of circuit 100 is engaged in an activity which requires a greater attention to safety. In one embodiment, speed determining component 170 uses signal generator 176 to generate a signal to data control component 104 when the speed of circuit 100 exceeds the speed threshold. In response to the signal from speed determining component 170 data control component 104 blocks the output of a signal from circuit 100.

In another embodiment, speed comparator 175 may perform a comparison of the expected GNSS Doppler frequency shift measurements from a remote source and GNSS Doppler frequency shift measurements performed by circuit 100 to determine the speed of circuit 100. In one embodiment, Assisted-GPS (A-GPS) technology is used to facilitate the process of determining the position of circuit 100. A-GPS is a system in which outside sources provide a GPS receiver with data permitting the receiver to find GPS satellite signals more readily than can be done on a stand alone basis. The data is derived from a GNSS receiver which is remotely located from the circuit 100 and provides the A-GPS data to the circuit. Because of the proximity of the GNSS receiver to circuit 100, GNSS signal data such as code phases, Doppler frequency shifts, etc., as well as local signal errors due to atmospheric or physical conditions should be approximately the same for both the remotely located GNSS receiver and circuit 100. By sending this information to circuit 100, the time to fix and track GNSS satellites is greatly reduced for circuit 100. The A-GPS system is widely used to comply with the wireless E911 standard which mandated that cellular telephone position information be made available to emergency call dispatchers because it permits a cellular telephone to generate a position fix quicker than if an autonomous position fix was being generated.

Because GPS, and other GNSS navigation systems, rely upon a plurality of satellites which broadcast a unique code, GNSS receivers must determine which codes are being received at a particular location. The receiver must correlate the received C/A code with a stored version and then determine a time delay between when the C/A code was broadcast and when it was received by the receiver. Because the satellite is constantly moving with reference to the receiver, a Doppler shift of the frequency of the C/A code is encountered which can hinder acquisition of the satellite signals because the receiver has to search for the frequency of the C/A code. As a result, it can take minutes for a GPS receiver to create an initial position fix autonomously.

Figure 5:
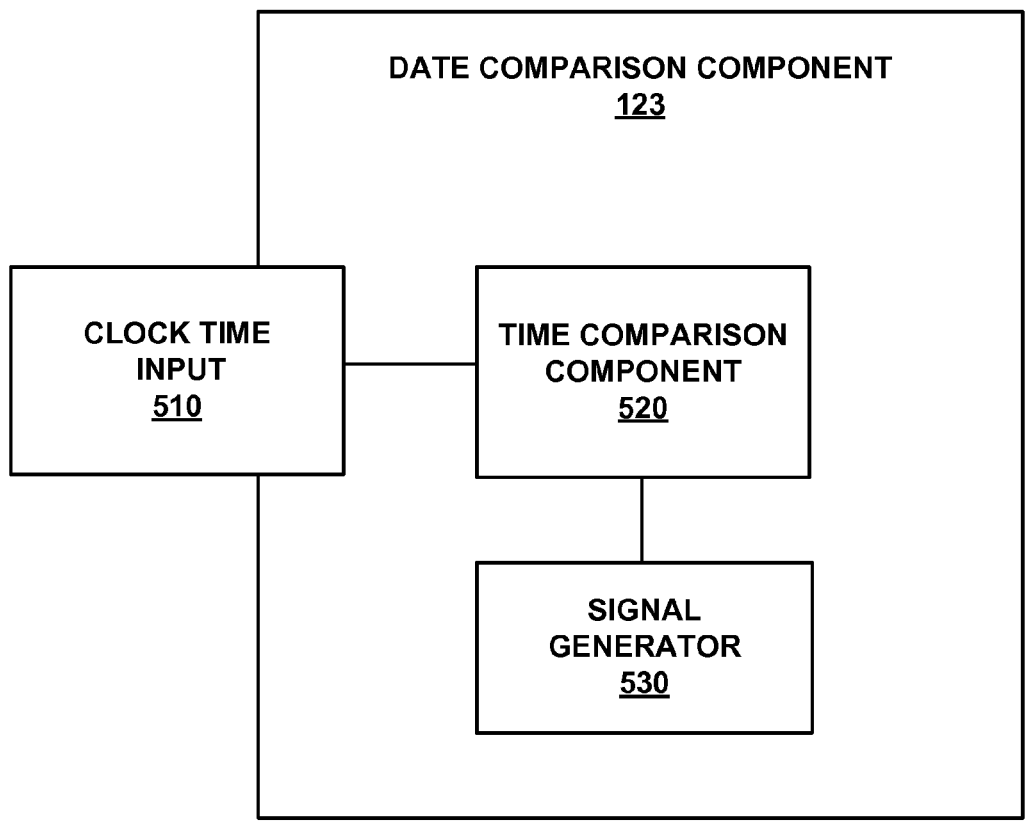
FIG. 5 is a block diagram of a date comparison component in accordance with an embodiment of the present technology.

A-GPS was developed to overcome the difficulties in acquiring a signal and to speed the time it takes a receiver to generate a position fix. Due to the proximity of the GPS receiver at the cellular base station to the location of a cellular telephone, the GNSS Dopplers, GNSS code phases, and satellite bit times at the cellular base station (e.g., 510 of FIG. 5) should closely approximate those of the location of the cellular telephone (e.g., circuit 100). Thus, by providing this information to the GPS receiver in the cellular telephone, the GPS receiver can acquire and track satellites better and realize an increase in signal sensitivity.

In one embodiment, navigation data deriving component 103 of circuit 100 uses the GNSS signal acquisition assistance data to more quickly acquire the satellites within view. In one embodiment, this includes, but is not limited to, synchronizing local oscillators to the desired carrier frequencies, tuning with the predicted Dopplers to account for frequency shift due to the relative motion of the satellite and circuit 100, and narrowing the code phase searches based upon the predicted GNSS code phases sent from the A-GPS system. Circuit 100 may further use a GPS time estimate for GPS data bit timing, pre-detection interval timing, generating a clock time tag for a GNSS signal, and for linearizing pseudoranges to satellites. It is noted that in one embodiment, Assisted-GPS data is not required for circuit 100 to determine its position. However, in one embodiment the use of Assisted-GPS data is beneficial in reducing the time to first fix for circuit 100.

In one embodiment, the speed of circuit 100 is performed using vector analysis. For example, in one embodiment the Doppler frequency shift of signals from each satellite in view of the A-GPS system is converted with vector arithmetic into a 3-dimensional vector. Each satellite Doppler frequency shift is equivalent by constants to a rate of change in the distance between the satellite and a GNSS receiver (e.g., of the A-GPS system, or navigation data deriving component 103 of circuit 100). The Doppler frequency shift is due to the movement of the satellite relative to the GNSS receiver of the A-GPS system or of circuit 100. Typically, three 3-dimensional Dopplers, or range rates, are converted with vector arithmetic into a 3-dimensional vector. In one embodiment, the expected 3-dimensional vector, which is calculated based upon the relative motion between a satellite and the A-GPS system, is compared with the measured Doppler frequency shift which is based upon the relative motion between the satellite and circuit 100. The difference of these two values can be attributed to the motion of circuit 100 alone as the A-GPS system is stationary. In one embodiment, speed determining component 170 uses the data sent by the A-GPS system to determine the 3-dimensional vector which describes the motion of the satellite relative to the A-GPS system. Speed determining component 170 can also use data based upon the analysis of a GNSS signal received by antenna 101 to determine the motion of circuit 100 relative to the satellite. Comparator 175 is configured to compare these two values to determine the speed of circuit 100 in one embodiment. It is noted that the functionality of speed determining component 170 is in navigation data deriving component 103 in one embodiment.

Figure 1H:
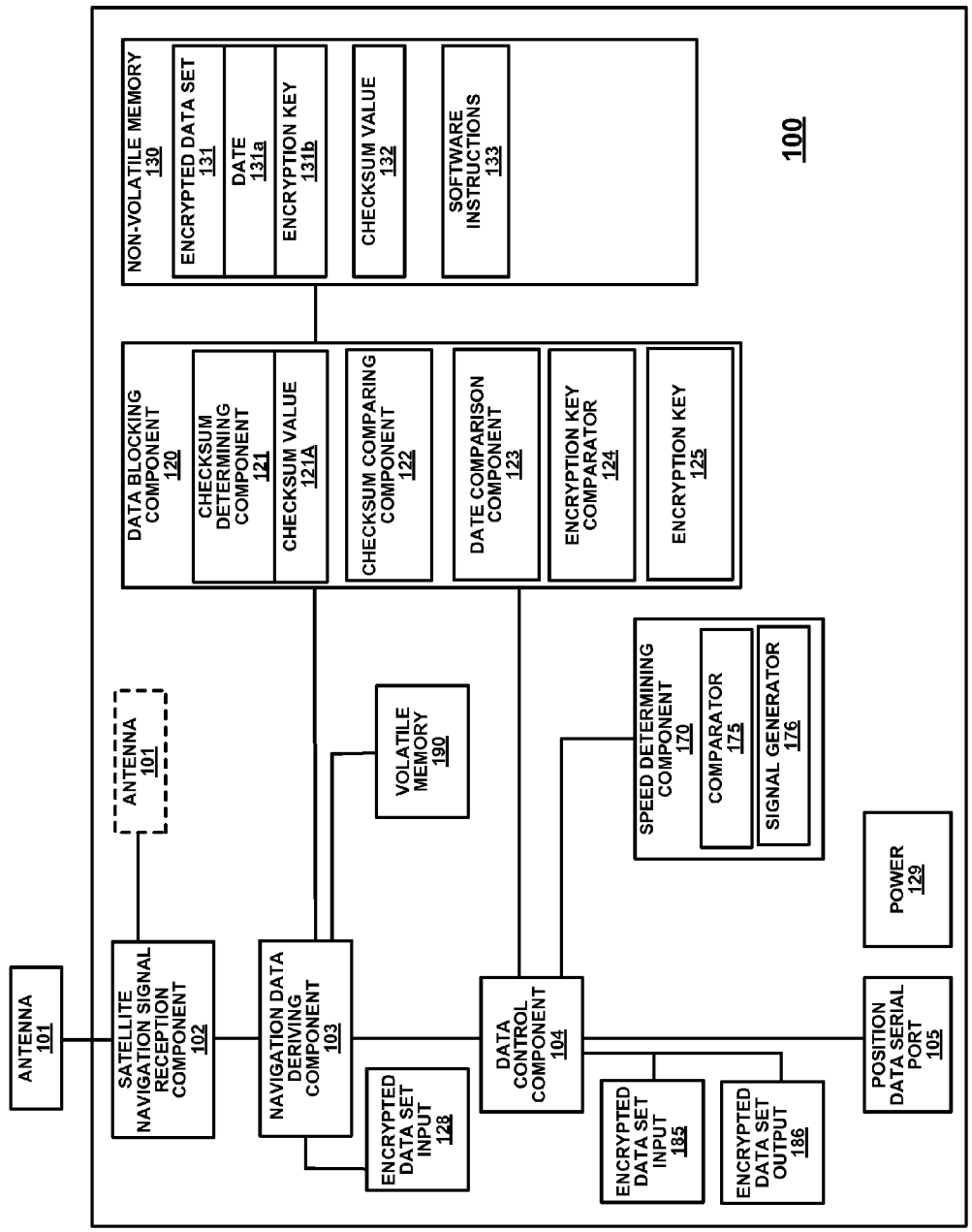
FIG. 1H is a block diagram of a circuit for exclusion zone compliance in accordance with embodiments of the present technology.

In FIG. 1H, data blocking component 120 comprises checksum determining component 121, checksum value 121*a*, checksum comparing component 122, date comparison component 123, encryption key comparator 124, and encryption key 125. Circuit 100 further comprises encrypted data set input 185 and an encrypted data set output 186. Circuit 100 further comprises speed determining component 170. In FIG. 1H, circuit 100 further comprises an altitude limiting component 195. In one embodiment, altitude limiting component 195 is configured to receive an indication of the altitude of circuit 100 from navigation data deriving component 103 and for comparing that altitude with a stored altitude threshold value. It is well known in the art that a GNSS receiver (e.g., navigation data deriving component 103) can also derive the altitude of a device based upon a plurality of received satellite navigation signals. In the embodiment of FIG. 1H, altitude limiting component 195 generates a signal when the altitude of circuit 100 exceeds a pre-set altitude threshold. As an example, export control regulations have restricted the export of navigation devices to devices with an altitude limit of no more than 18,000 meters. Thus, altitude limiting component 195 can be configured to generate a signal when it determines that the altitude of circuit 100 exceeds 18,000 meters. It is noted that the altitude threshold can be set to a lower altitude if so desired. In one embodiment, the altitude threshold cannot be modified after manufacture. In response to the signal generated by altitude limiting component 195, data control component 104 blocks the output of a signal from circuit 100.

It is noted that data blocking component 120 may comprise other combinations of components described above with reference to FIGS. 1C, 1D, and 1E. For example, in one embodiment data blocking component 120 comprises checksum determining component 121, checksum value 121*a*, checksum comparing component 122, and date comparison component 123. In one embodiment, data blocking component 120 comprises checksum determining component 121, checksum value 121*a*, checksum comparing component 122, encryption key comparator 124, and encryption key 125. In one embodiment, data blocking component 120 comprises date comparison component 123, encryption key comparator 124, and encryption key 125.

In FIGS. 1A, 1C, 1D, 1E, 1F, 1G, and 1H circuit 100 further comprises a power coupling 129 for supplying power to circuit 100. In one embodiment, circuit 100 operates continuously, even when a device which utilizes circuit 100 is shut down. Thus, in one embodiment circuit 100 continuously monitors its geographic position without regard to the power status of a device to which it is coupled. In one embodiment, if power to circuit 100 is interrupted, data control component 104 requires a login procedure is followed to permit the output of a signal from said navigation data deriving component 103. In one embodiment, if power to circuit 100 is interrupted, encryption key 125 is no longer usable to circuit 100. For example, encryption key 125 will be lost if it is stored in volatile memory 190 and power to circuit 100 is interrupted. Thus, to be able to render circuit 100 usable, a correct encrypted encryption key 125 has to be loaded into circuit 100. In one embodiment, a correct encryption key 125 will not be made accessible for loading into circuit 100 unless the identity of the party currently in possession of circuit 100 can be verified.

Thus, embodiments of the present technology can facilitate the export of a geographic position determining device and/or data accessible via circuit 100 while reducing the likelihood that it can be misused by, for example, commercial entities, rogue nations, or other groups. For example, if a certain government is deemed likely to misuse GNSS data, that nation may be designated as a restricted area. As a result, use of circuit 100 to determine a geographic position will be prevented. Circuit 100 may operate anywhere in the world and the exclusionary zone may be located anywhere in the world. In another embodiment, sensitive data will not be accessible unless circuit 100 is located outside of an exclusion zone. In another embodiment, time sensitive data will not be accessible via circuit when the time period for accessing that data has expired. In another embodiment, circuit 100 can be used to prevent the accessing of data, including geographic data, or data used to determine a geographic position, if circuit 100 is moving, or is moving faster than a pre-determined speed threshold. This facilitates implementing weapons proliferation controls as circuit 100 cannot be altered for use as, for example, a weapons guidance system, or used in a manner which circumvents a commercial agreement. Thus, even if an unintended third party should gain control of a properly exported version of circuit 100, that third party cannot use or alter circuit 100 for use within a designated exclusion zone.

It is further noted that circuit 100 may be implemented to enforce commercial exclusion zones in addition to other considerations which may determine exclusion zones. Thus, if an entity, such as a communications network for example, utilizes GNSS derived data, access to this data can be prevented if that entity fails to pay a royalty or other fee. Another example in which commercial exclusion zones may be implemented in accordance with the present technology is to prevent purchasing circuit 100 in a low cost region and re-selling it in a higher cost region in order to turn a profit. In embodiments of the present technology, circuit 100 limits the output of a signal from navigation data deriving component 103 to regions in which it is allowed to operate (e.g., a low cost region) to prevent unauthorized re-selling at a profit.

Additionally, in embodiments of the present technology, the designated exclusion zones may be dynamically updated to reflect changed relations. Thus, it is also possible to quickly redefine one or more of the exclusion zones to permit operation of circuit 100 within that zone. For example, if a government determines that a nation is to no longer be excluded from using circuit 100, the definition of which geographic regions are considered exclusion zones can be updated to reflect the new status of that nation. Alternatively, if the price of circuit 100, or an electronic device coupled therewith, in a previously excluded region is now comparable to the price in a second region, the definitions of the exclusion zones can be updated such that circuit 100 can be operated in the previously excluded region.

Example GNSS Receiver

With reference now to FIG. 1B, a block diagram is shown of an embodiment of an example GNSS receiver which may be used in accordance with various embodiments described herein. In particular, FIG. 1B illustrates a block diagram of a GNSS receiver in the form of a general purpose GPS receiver 180 capable of demodulation of the L1 and/or L2 signal(s) received from one or more GPS satellites. It is noted that the components described below with reference to FIG. 1B may be performed by satellite navigation signal reception component 102 and navigation data deriving component 103 described above with reference to FIG. 1A. For the purposes of the following discussion, the demodulation of L1 and/or L2 signals is discussed. It is noted that demodulation of the L2 signal(s) is typically performed by "high precision" GNSS receivers such as those used in the military and some civilian applications. Typically, the "consumer" grade GNSS receivers do not access the L2 signal(s). Embodiments of the present technology may be utilized by GNSS receivers which access the L1 signals alone, or in combination with the L2 signal(s). A more detailed discussion of the function of a receiver such as GPS receiver 180 can be found in U.S. Pat. No. 5,621,426. U.S. Pat. No. 5,621,426, by Gary R. Lennen, is titled "Optimized processing of signals for enhanced cross-correlation in a satellite positioning system receiver," and includes a GPS receiver very similar to GPS receiver 180 of FIG. 1B.

In FIG. 1B, received L1 and L2 signal is generated by at least one GPS satellite. Each GPS satellite generates different signal L1 and L2 signals and they are processed by different digital channel processors 152 which operate in the same way as one another. FIG. 1B shows GPS signals (L1=1575.42 MHz, L2=1227.60 MHz) entering GPS receiver 180 through a dual frequency antenna 101. Antenna 101 may be a magnetically mountable model commercially available from Trimble® Navigation of Sunnyvale, Calif., 94085. Master oscillator 148 provides the reference oscillator which drives all other clocks in the system. Frequency synthesizer 138 takes the output of master oscillator 148 and generates important clock and local oscillator frequencies used throughout the system. For example, in one embodiment frequency synthesizer 138 generates several timing signals such as a 1st LO1 (local oscillator) signal 1400 MHz, a 2nd LO2 signal 175 MHz, a (sampling clock) SCLK signal 25 MHz, and a MSEC (millisecond) signal used by the system as a measurement of local reference time.

A filter/LNA (Low Noise Amplifier) 134 performs filtering and low noise amplification of both L1 and L2 signals. The noise figure of GPS receiver 180 is dictated by the performance of the filter/LNA combination. The downconverter 136 mixes both L1 and L2 signals in frequency down to approximately 175 MHz and outputs the analogue L1 and L2 signals into an IF (intermediate frequency) processor 30. IF processor 150 takes the analog L1 and L2 signals at approximately 175 MHz and converts them into digitally sampled L1 and L2 inphase (L1 I and L2 I) and quadrature signals (L1 Q and L2 Q) at carrier frequencies 420 KHz for L1 and at 2.6 MHz for L2 signals respectively.

At least one digital channel processor 152 inputs the digitally sampled L1 and L2 inphase and quadrature signals. All digital channel processors 152 are typically are identical by design and typically operate on identical input samples. Each digital channel processor 152 is designed to digitally track the L1 and L2 signals produced by one satellite by tracking code and carrier signals and to form code and carrier phase measurements in conjunction with the microprocessor system 154. One digital channel processor 152 is capable of tracking one satellite in both L1 and L2 channels. Microprocessor system 154 is a general purpose computing device which facilitates tracking and measurements processes, providing pseudorange and carrier phase measurements for a navigation processor 158. In one embodiment, microprocessor system 154 provides signals to control the operation of one or more digital channel processors 152. Navigation processor 158 performs the higher level function of combining measurements in such a way as to produce position, velocity and time information for the differential and surveying functions. Storage 160 is coupled with navigation processor 158 and microprocessor system 154. It is appreciated that storage 160 may comprise a volatile or non-volatile storage such as a RAM or ROM, or some other computer readable memory device or media. It is noted that in one embodiment, the output from any of digital channel processors 152, microprocessor system 154, and navigation processor 158 may be communicatively coupled with data control component 104 of FIG. 1A. In one embodiment, GPS receiver 180 is configured to output a signal when the L1 and/or L2 signals from at least one GPS satellite cannot be accessed, or detected, by GPS receiver 180. In response to this signal, data control component 104 will automatically block the output of a signal from circuit 100. This is to prevent bypassing the data blocking functions of circuit 100 by preventing navigation data deriving component from determining the geographic position of circuit 100.

One example of a GPS chipset upon which embodiments of the present technology may be implemented is the Copernicus™ chipset which is commercially available from Trimble® Navigation of Sunnyvale, Calif., 94085. Other examples of a GPS chipsets upon which embodiments of the present technology may be implemented are the SiRFstar III™ GSC3e/LP and GSC3f/LP chipsets which are commercially available from SiRF® Technology Inc., of San Jose, Calif., 95112. In other words, the Copernicus™ and SiRFstar III™ chipsets may integrate components of circuit 100 in order to control the regions in which the GPS receiver is operational.

It is noted that in one embodiment the components of circuit 100 shown in FIGS. 1A, 1C, 1D, 1E, 1F, 1G, and 1H are a plurality of discreet components disposed upon a printed circuit board. In other words, circuit 100 is implemented as a plurality integrated circuits of the chipset of a satellite navigation device. In another embodiment, the components of circuit 100 are implemented as a single integrated circuit chip. Furthermore, in one embodiment the components of circuit 100 discussed above may be filled surrounded by an epoxy during manufacturing to make physical tampering with these components (e.g., altering wires, connections, ports, etc.) more difficult. It is noted that the filling or surrounding with epoxy may not extend to the RF components of circuit 100 and/or GPS receiver 180 of FIG. 2.

Figure 2:
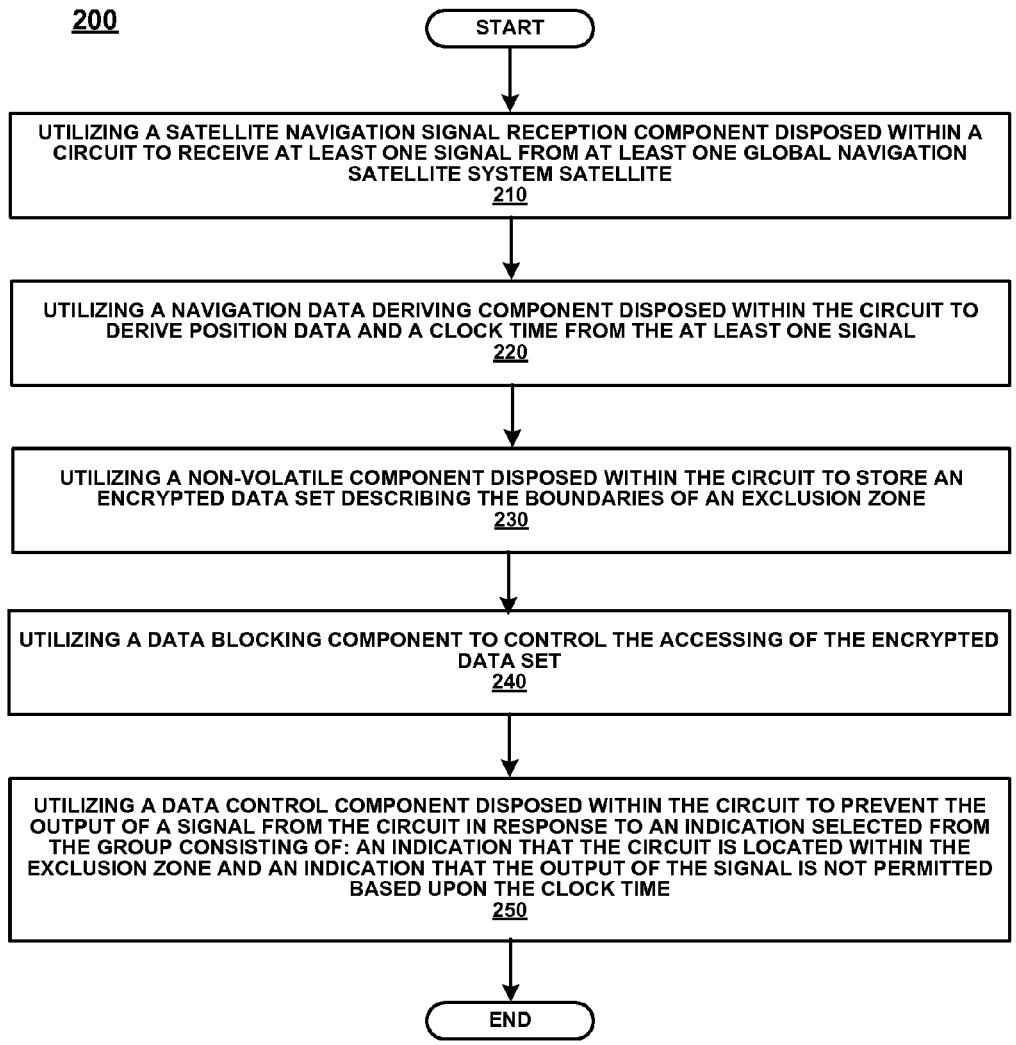
FIG. 2 is a flowchart of a method for implementing an exclusion zone of a GNSS receiver in accordance with an embodiment of the present technology.

FIG. 2 is a flowchart of a method 200 for implementing exclusion zone compliance in accordance with one embodiment of the present technology. In operation 210 of FIG. 2, a satellite navigation signal reception component disposed within a circuit is utilized for receiving at least one signal from at least one Global Navigation Satellite System satellite. As discussed above, satellite navigation signal reception component 102 of circuit 100 is used for receiving at least one signal from at least one GNSS satellite and for converting that signal into an intermediate frequency signal. Satellite navigation signal reception component 102 is also used to sample the intermediate frequency signals and acquire and track the signal received from the GNSS satellites in view. Satellite navigation signal reception component 102 is also used to derive timing measurements from the intermediate frequency signal and determine pseudoranges, signal phases, and Doppler frequency shift data from the intermediate frequency signal.

In operation 220 of FIG. 2, a navigation data deriving component disposed within circuit 100 is utilized to derive position data and a clock time from the at least one signal. As discussed above, navigation data deriving component 103 is for determining the geographic position of circuit 100 based upon the data from satellite navigation signal reception component 102. Typically, that geographic position, or unprocessed navigation data such as received satellite navigation signals, derived timing measurements, pseudoranges, signal phases, and Doppler frequency shift data is output by circuit 100. This information can be used to control a device based upon its geographic position, or to simply report the geographic position of a user of circuit 100.

In operation 230 of FIG. 2, a non-volatile memory component disposed within the circuit is utilized to store an encrypted data set describing the boundaries of an exclusion zone. As described above, non-volatile memory 130 may comprise a read-only memory, or a programmable non-volatile memory device used to store encrypted data set 131. In one embodiment, encrypted data set 131 cannot be updated or changed when non-volatile memory 130 is a read-only memory device. In another embodiment, encrypted data set 131 can be updated when stored in a programmable non-volatile memory device.

In operation 240 of FIG. 2, a data blocking component communicatively coupled with the non-volatile memory device and the navigation data deriving component is utilized to control the accessing of the encrypted data set. As described above, navigation data deriving component 103 and data control component 104 are communicatively coupled with non-volatile memory 130 via a data blocking component 120. Data blocking component 120 controls the accessing of encrypted data set 131 from non-volatile memory 130. Data blocking component controls the accessing of encrypted data set 131 based upon a comparison of checksum values, current date and/or time, a comparison of encryption keys, or a combination thereof. In one embodiment, when data blocking component prevents the accessing of encrypted data set 131, which prevents a comparison of the current geographic position of circuit 100 with the exclusion zone description stored as encrypted data set 131. In one embodiment, if a comparison of the present geographic position of circuit 100 with the exclusion zone description cannot be performed, data control component 104 prevents the output of a signal from circuit 100.

In operation 250 of FIG. 2, a data control component disposed within circuit 100 is utilized to prevent the output of a signal from the circuit 100 in response to an indication selected from the group consisting of: an indication that said circuit is located within the exclusion zone and an indication that output of said signal is not permitted based upon the clock time. As discussed above, if data control component 104 receives an indication that circuit 100 is located within an exclusion zone, data control component 104 prevents the output of a signal from navigation data deriving component 103 outside of circuit 100. In so doing, data control component 104 renders circuit 100 unusable as a position determining component within any exclusion zones identified by encrypted data set 131. Embodiments of the present technology are advantageous over other exclusion zone solutions because it is implemented as a circuit rather than a software implemented solution. This makes it more difficult to circumvent exclusion zone restrictions, export control restrictions, or commercial restrictions, on the operation of a device based upon its geographic position. Additionally, embodiments of the present technology facilitate authentication of the data set used to identify exclusion zones which therefore makes circumventing the geographic restrictions more difficult.

Figure 3:
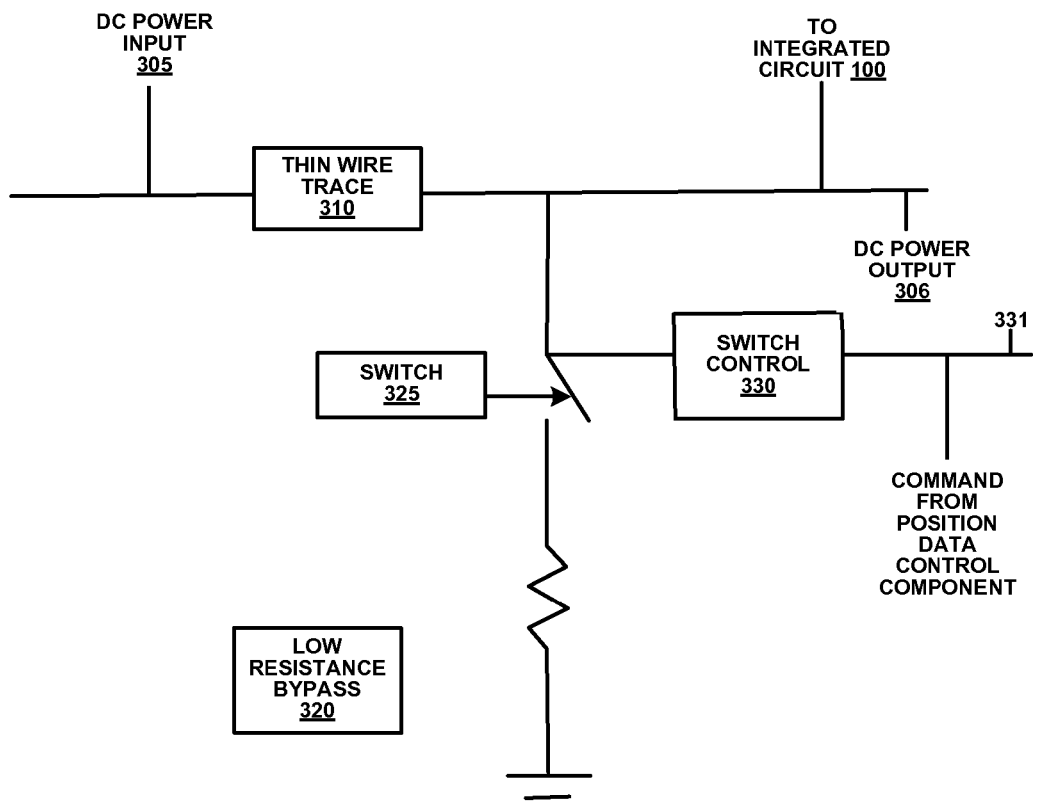
FIG. 3 is a block diagram of an example circuit for disabling a circuit for exclusion zone compliance in accordance with an embodiment of the present technology.

FIG. 3 is a block diagram of an example circuit 300 for disabling a circuit for exclusion zone compliance in accordance with an embodiment of the present technology. In FIG. 3, a direct current (DC) power input 305 is coupled with a thin wire trace 310. DC power input is configured for providing power from power coupling 129 to the rest of circuit 100. Also shown is a switch 325 coupled with DC power output 306 and with a low resistance bypass 320. In one embodiment, switch control 330 controls the operation of switch 325.

During normal operating conditions, power from power coupling 129 passes through thin wire trace 310 to the rest of circuit 100 via DC power output 306. Additionally, switch control 330 controls switch 325 such that it is open and does not permit current to pass to low resistance bypass 320. In one embodiment, when it is determined that circuit 100 is within an exclusion zone, data control component 104 generates a signal which is input to switch control 330. Switch control 330 then closes switch 325 such that power is drawn from DC power output 306 to low resistance bypass 320. In so doing sufficient current is drawn through thin wire trace 310 that it burns out when switch 325 is closed. As a result, power from power coupling 129 to the rest of circuit 100 is permanently interrupted and circuit 100 cannot be subsequently used to receive navigation signals, or to output data used for determining a geographic position. It is noted that thin wire trace 310 can be implemented as a fusible link in one embodiment.

It is noted that a variation of circuit 300 may be inserted between data control component 104 and position data serial port 105 such that in response to a signal from data control component 104 results in the closing of switch 325 in one embodiment. This in turn permanently severs the communicative coupling between data control component 104 and position data serial port 105. As a result, navigation data from circuit 100 is permanently interrupted and circuit 100 cannot be subsequently used to receive navigation signals, or to output data used for determining a geographic position.

Figure 4:
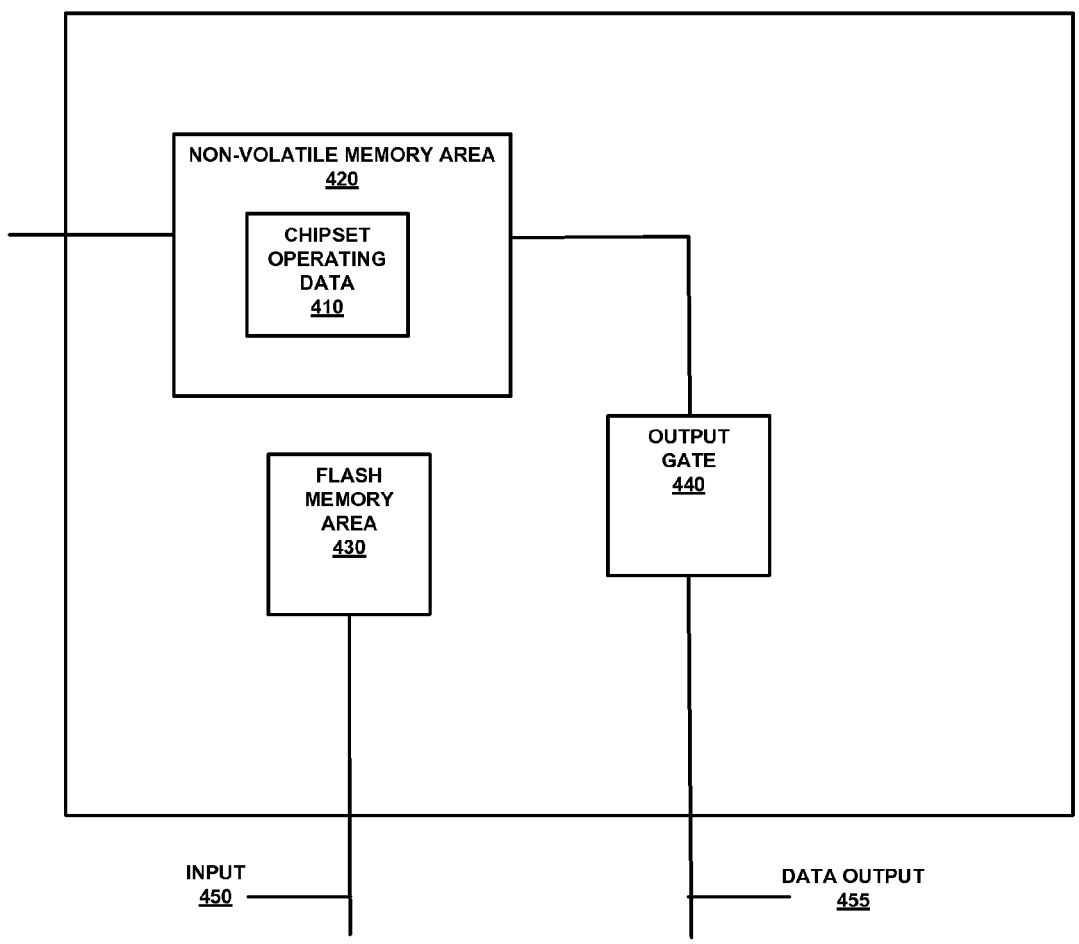
FIG. 4 is a block diagram of an example non-volatile memory in accordance with one embodiment of the present technology.

FIG. 4 is a block diagram of an example non-volatile memory 130 in accordance with one embodiment of the present technology. In one embodiment, chipset operating data 410 is stored in a non-volatile memory area 420. In one embodiment, non-volatile memory area 420 comprises a read-only memory device for permanently storing digital data and instructions comprising an operating system for circuit 100. In another embodiment, non-volatile memory area 420 comprises a programmable memory device such as a Flash memory device, an EEPROM memory device, or the like for persistent storage of digital data and instructions for circuit 100. The use of programmable memory for the persistent storage of data and instructions is widely implemented in the computing arts. One use of these devices is to store BIOS data and instructions used to boot a computer or other electronic device. Programmable memory is increasingly used to store BIOS and similar data because it has the additional advantage of permitting updates or changes to the operating system of the circuit via remote means which was not possible with previously used Write Once, Read Many data storage devices.

In FIG. 4, non-volatile memory 130 further comprises Flash memory area 430. In one embodiment, Flash memory area 430 is not accessible from outside of non-volatile memory 130. In other words, Flash memory area 430 cannot be reprogrammed or updated with new data once it has been written. It is noted that Flash memory area 430 may implement another type of persistent memory in one embodiment of the present technology. In FIG. 4, non-volatile memory 130 further comprises an output gate 440 from which digital data and instructions from non-volatile memory 130 are output to other components of circuit 100.

In one embodiment, Flash memory area 430 stores a command which is written to output gate 440 in response to a signal from data control component 104 via input 450. For example, during normal operation of non-volatile memory 130, the gating function of output gate 440 is written as a logical "0" and digital data and instructions can be output from non-volatile memory 130 via data output 455. However, if it is determined that circuit 100 is within an exclusion zone, data control component 104 outputs a signal to non-volatile memory 130 which is input to Flash memory area 430 via input 450. In response to the signal from data control component 104, Flash memory area 430 writes a destruction command stored therein into output gate 440. In one embodiment, the destruction command re-writes the gating function of output gate 440 to a logical "1" which inhibits the data output functioning of output gate 440. Thus, the digital data and instructions comprising the operating system of circuit 100 can no longer be output from non-volatile memory 130. In so doing, circuit 100 is rendered unusable. Furthermore, because its operating system is no longer accessible, there is no way to enable output gate 440 and circuit 100 is thus rendered permanently disabled. It is noted that the destruction command can be written from Flash memory 430 into output gate 440 in response to other conditions or commands as well. For example, the detection of an unauthorized operating state, or of tampering with data or components of circuit 100, may also result in the writing of the destruction command from Flash memory 430 into output gate 440.

Terrestrial-Signal Based Exclusion Zone Compliance

While embodiments of exclusion zone compliance which use satellite based navigation systems are useful, there are times when satellite navigation signals are not available such as in cities, or when the signal is obscured such as beneath foliage, inside of buildings. In cities, the "urban canyon effect" describes the phenomenon in which the radio signals from navigation satellites can bounce off of and between buildings which complicates acquisition and processing of the timing signals from the satellites. Thus, at times it may be beneficial to provide an alternate method for determining the geographic position of a device. Additionally, many devices still are not equipped with GNSS receivers and processing circuits.

Furthermore, at times the precision of a GNSS receiver may not be needed to enforce exclusion zone compliance. For example, in cases where an exclusion zone is as large as a metropolitan area, or a country, a less precise determination of the geographic position of a device may be sufficient to enforce the exclusion zone. In embodiments of the present technology, a circuit for exclusion zone compliance based upon terrestrial radio signals can be used to determine the geographic position of a device.

In an embodiment, a terrestrial-based radio location system may be employed instead of the GPS/GNSS positioning system. The use of terrestrial-based radio signals as navigation aids is well known. For example, radio signals were developed and widely used during WWII. One example of a terrestrial-based radio navigation system is the Long Range Navigation (LORAN) system which was widely used until recently. The principles of operation are based upon the difference of time-of-flight, or time-of-arrival, measurements between a transmitter and a receiver using a reference time at the transmitter and receiver. Using this information, a radial distance from the transmitter to the receiver can be calculated. By calculating three radial distances from three transmitters to the receiver, three radial distances are determined (e.g., as represented by a circle centered on each of the three transmitters). The intersection point of these three circles represents the geographic position of the receiver. This is process often referred to as "triangulation" or "multilateration." Other methods are well-known in the arts, including angle of arrival and time difference of arrival. Implementations of the LORAN system are described in U.S. Pat. No. 3,743,754, titled "Loran Signal Synthesizer," by Robert M. Eisenberg, U.S. Pat. No. 3,683,383, titled Loran Receiver-Indicator, by Sidney G. Knox, and U.S. Pat. No. 4,166,275, titled Loran Receiver System, by Sheldon B. Michaels, Otis Philbrick, and Jeffrey Morris which are incorporated by reference in their entirety herein.

It is noted that the radio transmitters can be of any kind in accordance with various embodiments. However, the radio transmitters most commonly available today are based on transmissions from Frequency Modulated (FM) radio transmitters, television transmitters, Ultra-Wideband (UWB) transmitters, cellular transmitter/receivers at cell towers, or Wi-Fi transmitter/receivers located wherever a user so desires. Cellular telephones have been manufactured for several years with the capability to triangulate their location based upon signals from nearby celltower transmitters. A paper entitled "Overview of Radiolocation in CDMA Cellular Systems" was published in the IEEE Communications Magazine in April 1998, explaining the details of cellular-based positioning systems in accordance with embodiments. An identical process may be implemented in Wi-Fi systems, which comply with the 802.11 specification.

Figure 10:
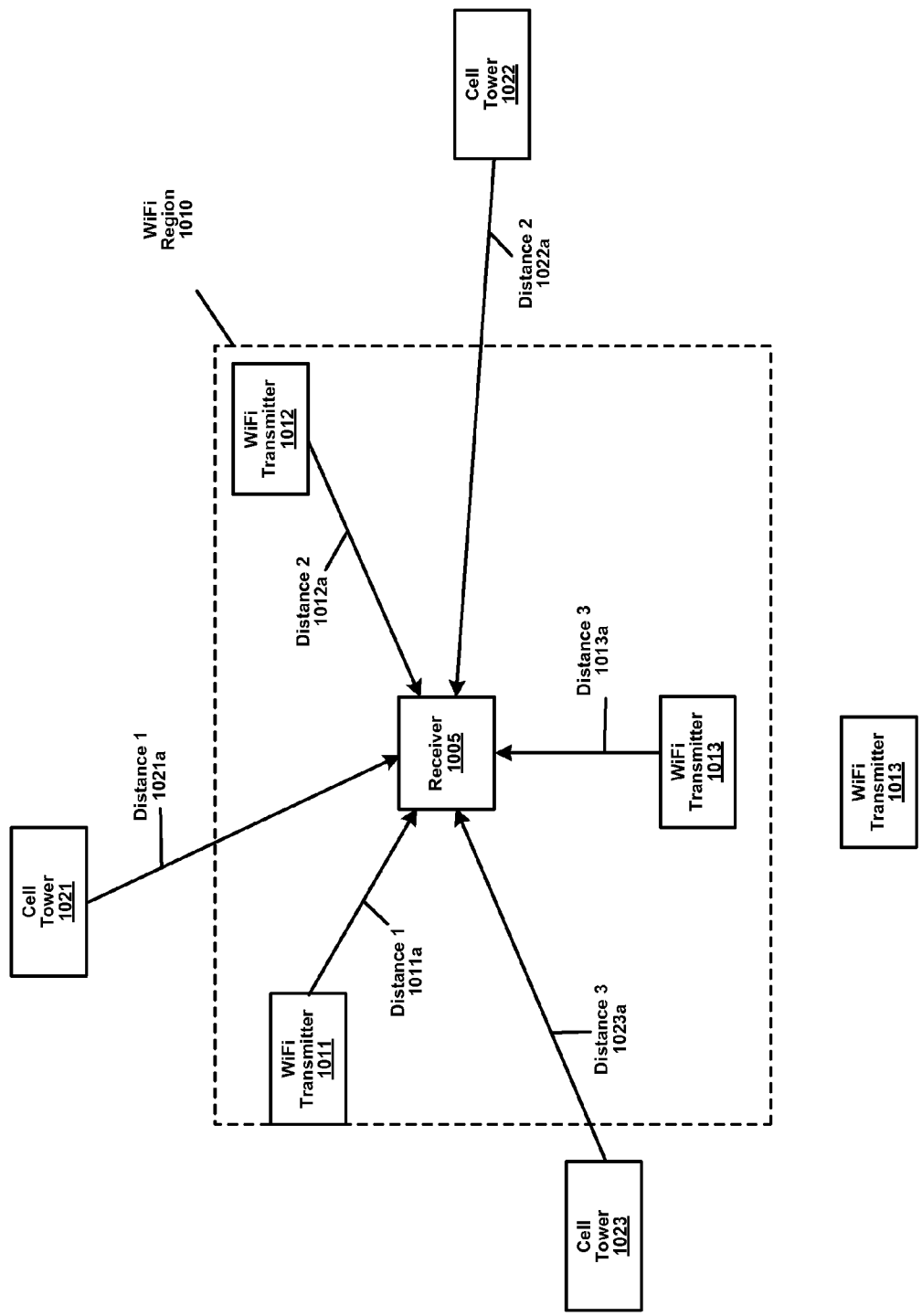
FIG. 10 shows the principles of estimating the position of a receiver based upon time of flight or time of arrival measurements in accordance with various embodiments.

FIG. 10 shows the principles of estimating the position of a receiver based upon time of flight or time of arrival measurements. In FIG. 10, a WiFi region 1010 is shown in which a receiver 1005 receives radio signals from WiFi transmitters 1011, 1012, and 1013. Receiver 1005 is located at a first distance 1011a from WiFi transmitter 1011, a second distance 1012a from WiFi transmitter 1012, and a third distance 1013a from WiFi transmitter 1013. Because the radio signal from each of WiFi transmitters 1011, 1012, and 1013 carries timing data, receiver 1005 can determine distances 1011a, 1012a, and 1013a based upon the time difference between when the respective radio signals were transmitted and when they are received at receiver 1005. If receiver 1005 can access information which provides the known location of WiFi transmitters 1011, 1012, and 1013, it can determine a radius from each known location using the radii which were derived above. Receiver 1005 can then determine a location at which all three radii overlap. This is the position at which receiver 1005 is located.

In a similar process, the position of receiver 1005 can be determined using cellular telephone transmissions. In FIG. 10, receiver 1005 is located at a first distance 1021a from WiFi transmitter 1021, a second distance 1022a from WiFi transmitter 1022, and a third distance 1023a from WiFi transmitter 1023. Again, the radio signal from each of cell towers 1021, 1022, and 1023 carries timing data, receiver 1005 can determine distances 1021a, 1022a, and 1023a based upon the time difference between when the respective radio signals were transmitted and when they are received at receiver 1005. If receiver 1005 can access information which provides the known location of cell towers 1021, 1022, and 1023, it can determine a radius from each known location using the radii which were derived above. Receiver 1005 can then determine a location at which all three radii overlap. This is the position at which receiver 1005 is located. It is appreciated that similar triangulation or multilateration can be accomplished using Frequency Modulated (FM) radio signals or television signals. Likewise, these techniques of triangulation/multilateration can be utilized with a variety of combinations of mixed signal types. Some examples of such combinations of mixed signal types include, but are not limited to: a cell tower signal, and two FM radio station signals; or a WiFi signal, a cell tower signal, and an FM radio station signal; or a cell phone tower signal, an FM radio station signal, and a television station signal.

Figure 6:
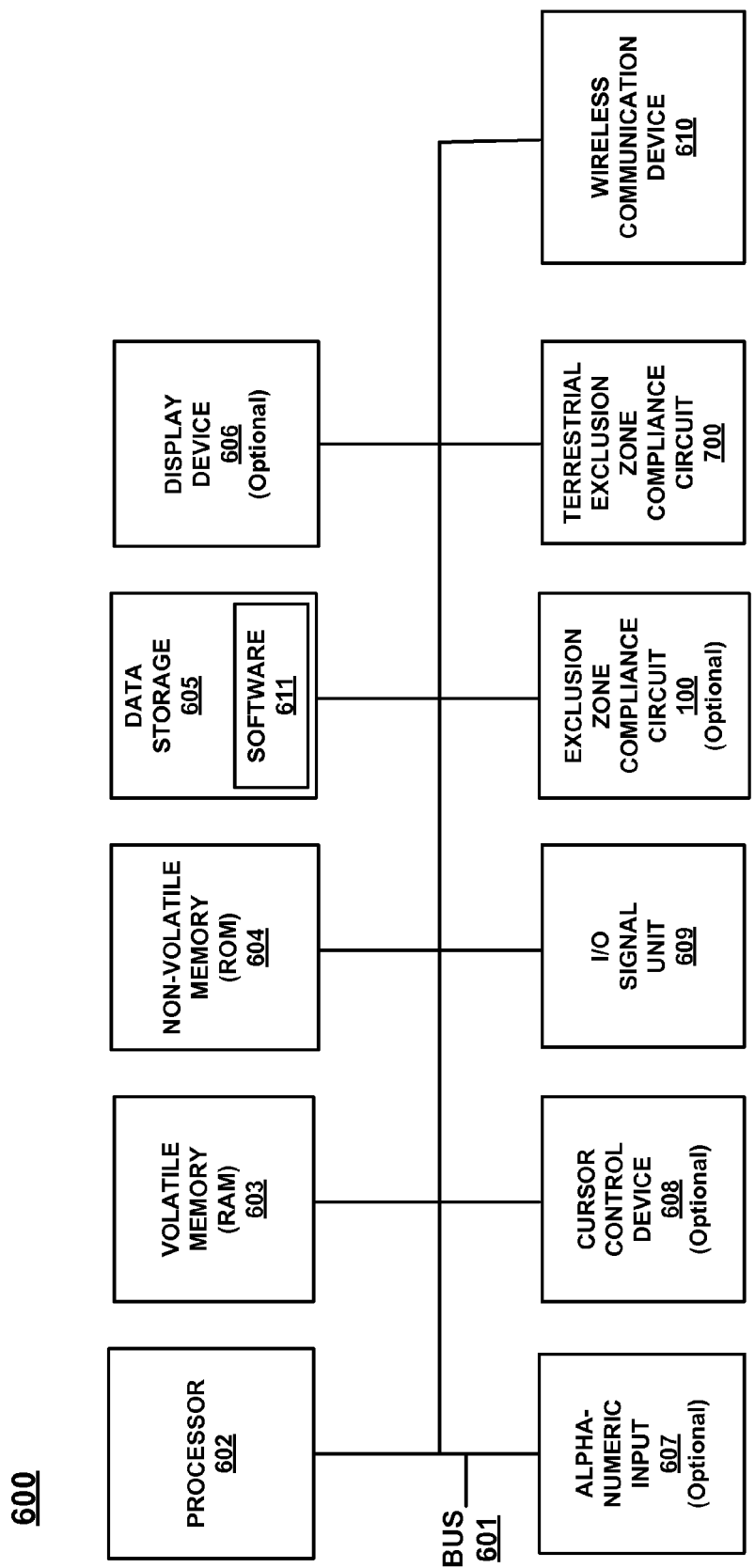
FIG. 6 is a block diagram of an electronic device which implements terrestrial-signal based exclusion zone compliance in accordance with an embodiment of the present technology.

With reference to FIG. 6, embodiments are comprised of computer-readable and computer-executable instructions that reside, for example, in electronic device 600. It is appreciated that electronic device 600 of FIG. 6 is intended as an example only and that embodiments can operate within a number of different electronic devices including embedded computer systems, laptop computer systems, hand-held electronic devices, cellular telephones, and navigation devices.

In the present embodiment, electronic device 600 includes an address/data bus 601 for conveying digital information between the various components, a central processor unit (CPU) 602 for processing the digital information and instructions, a volatile main memory 603 comprised of volatile random access memory (RAM) for storing the digital information and instructions, and a non-volatile read only memory (ROM) 604 for storing information and instructions of a more permanent nature. In addition, electronic device 600 may also include a data storage device 605 (e.g., a magnetic, optical, floppy, or tape drive or the like) for storing vast amounts of data. It should be noted that the software program for performing terrestrial-signal based exclusion zone compliance of in accordance with various embodiments can be stored in volatile memory 603, data storage device 605 (e.g., software 611).

Devices which are optionally coupled to electronic device 600 include a display device 606 for displaying information to a user, an alpha-numeric input device 607 (e.g., a keyboard, keypad, or the like), and a cursor control device 608 (e.g., mouse, trackball, light pen, etc.) for inputting data, selections, updates, etc. Electronic device 600 can also include a mechanism for emitting an audible signal (not shown).

Returning still to FIG. 6, optional display device 606 of FIG. 6 may be a liquid crystal device, cathode ray tube, touchscreen, or other display device suitable for creating graphic images and alpha-numeric characters recognizable to a user. Optional cursor control device 608 allows a user to dynamically signal the two dimensional movement of a visible symbol (cursor) on a display screen of display device 606. Many implementations of cursor control device 608 are known in the art including a trackball, mouse, touch pad, joystick, or special keys on alpha-numeric input 607 capable of signaling movement of a given direction or manner displacement. Alternatively, it will be appreciated that a cursor can be directed and/or activated via input from alpha-numeric input 607 using special keys and key sequence commands. Alternatively, the cursor may be directed and/or activated via input from a number of specially adapted cursor directing devices.

Furthermore, electronic device 600 can include an input/output (I/O) signal unit (e.g., interface) 609 for interfacing with a peripheral device (not shown). As shown in FIG. 6, electronic device 600 further comprises an exclusion zone compliance circuit 100 which as described above with reference to FIGS. 1A-1H.

Electronic device 600 further comprises a wireless communication device 610. Wireless communications device 610 is for transmitting and receiving wireless messages (e.g., data and/or commands). In one embodiment, wireless communications device 610 comprises a cellular wireless antenna (not shown) and a cellular wireless modem (not shown). In one embodiment, electronic device 600 sends and receives messages using the Short Message Service (SMS). However, electronic device 600 is well suited to utilize other message formats as well such as the Global System for Mobile Communications (GSM) specification, or the Global Packet Radio Service (GPRS) specification. In one embodiment, wireless communications device 610 is compliant with a Code Division Multiple Access (CDMA) communication standard, or a variant thereof. Variants of the CDMA standard include, but are not limited to the CDMA-2000 standard, the WCDMA standard, the HSPDA standard, the TD-CDMA standard, and the cdmaOne standard. In another embodiment, wireless communications device 610 is compliant with the Time Division Multiple Access (TDMA) standard. In another embodiment, wireless communications device 610 is compliant with the Integrated Digital Enhanced Network (iDEN) specification. Additionally, other embodiments are well suited to implement potential 4G networks such as the Worldwide Interoperability for Microwave Access (WiMax) technology and the 3rd Generation Partnership Project (3GPP) Long Term Evolution (LTE) technology. Wireless communications device 610 can also use standards-based mobile internet protocols (IP) to provide interoperability between networks.

In one embodiment, wireless communication device 610 comprises a wireless network communications device which can use Internet protocols, such as Transmission Control Protocol/Internet Protocol (TCPIP), packet switching, Institute of Electronic and Electronics Engineers (IEEE) 802.11 standard, Wireless Local Area Network (Wi Lan), IEEE 802.16 standard (also commonly known as "WiMax"), and general packet radio service (GPRS), and the like.

Figure 7:
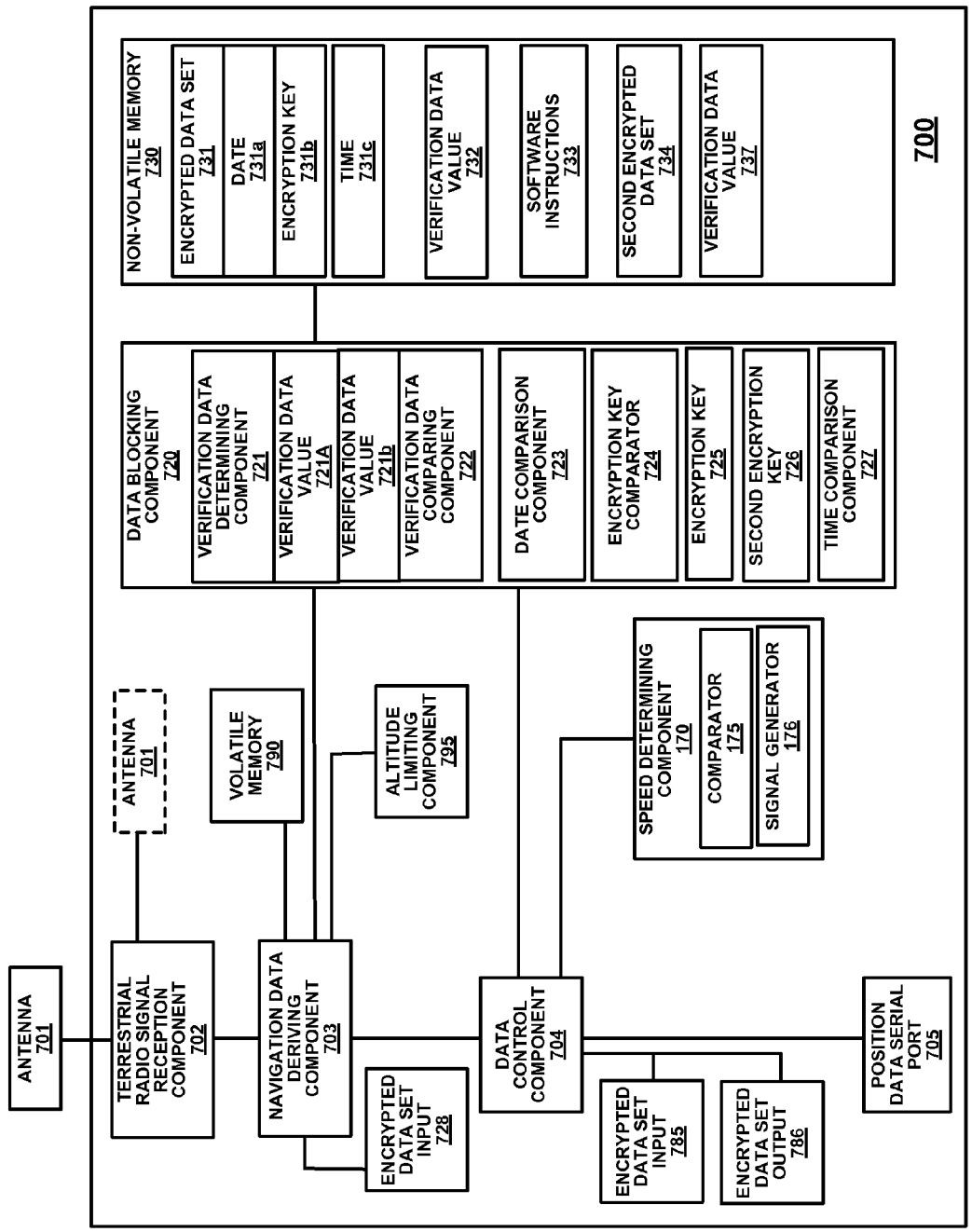
FIG. 7 is a block diagram of a circuit for implementing terrestrial-based exclusion zone compliance in accordance with an embodiment of the present technology.

FIG. 7 is a block diagram of a circuit 700 for exclusion zone compliance in accordance with embodiments of the present technology. In embodiments of the present technology, circuit 700 may be a component of a personal navigation system, an in-vehicle navigation system for use in personal driving or the like. In other embodiments, circuit 700 is not a component of a dedicated position determining device, but is a component which provides position determining functionality for an electronic device. For example, cellular telephones, PDAs, and automobiles are increasingly equipped with some form of GNSS or other type of position determining capability in order to provide a user with geographic positioning and position-based information. Alternatively, circuit 700 may be coupled with another device to enforce exclusion zone requirements for that device, or software or hardware or functionality disposed therein.

In one embodiment, circuit 700 comprises a terrestrial radio signal reception component 702 which is communicatively coupled with an antenna 701. It is noted that while antenna 701 is shown disposed outside of circuit 700, it can also comprise a component of circuit 700 in an embodiment of the present technology. In one embodiment, terrestrial radio signal reception component 702 is configured to process received terrestrial radio signals. These signals can include, but are not limited to, FM (Frequency Modulation) radio signals, television signals, cellular telephone signals, and wireless signals compliant with the IEEE 802.11 standards.

Circuit 700 further comprises a navigation data deriving component 703 which is communicatively coupled with terrestrial radio signal reception component 702 and with a position data serial port 705 via a data control component 704. In embodiments of the present technology, navigation data deriving component 703 is for determining the geographic position of the antenna 701 and the associated circuit 700 based upon the data from terrestrial radio signal reception component 702.

In one embodiment, navigation data deriving component 703 is configured to use a unique identifier of the transmission source of a received terrestrial radio signal to determine the geographic position of circuit 700. For example, if radio signal received by antenna 701 comprises an FM radio signal, navigation data deriving component 703 can extract Radio Broadcast Data System (RDS) data. This data is broadcast on a subcarrier frequency and can include timing data, station identification, and programming information.

Using the station identification data, navigation data deriving component 703 can access a database which correlates the station identification with the geographic coordinates of the transmitter for that station. Navigation data deriving component 703 then compares the received unique identifier of the transmission source with the station identifications stored in the database to determine the identity of the transmitter of the received terrestrial radio signal. In one embodiment, this database is stored within circuit 700 (e.g., second encrypted data set 734). Alternatively, circuit 700 can access a remotely located database using wireless communications device 610 via a wireless communications network. Navigation data deriving component 703 can then determine the location of the transmitter of a received terrestrial radio signal by associating the identification of the transmitter of the signal with the known geographic position of that transmitter using the database. In one embodiment, navigation data deriving component 703 can determine that it is located within a given radius of the transmitter based upon, for example, the known reception radius for that particular FM radio station. For example, navigation data deriving component 703 could determine that circuit 700 is within 20 miles of the transmitter for a particular received FM radio signal, but not determine the direction to the transmitter. While the use of a single received radio signal is insufficient to derive a direction to the transmission source of the received signal, an estimate which is accurate to within 20 miles may be precise enough for the enforcement of exclusion zone restrictions in some cases, especially as the size of the exclusion zone increases.

Furthermore, navigation data deriving component 703 can derive a pseudorange to the transmitter of the received radio signal based upon the timing data embedded within the RBDS signal. In other words, navigation data deriving component 703 can determine the delay between when the signal was transmitted and when it was received at circuit 700 using the timing data in the RBDS signal. This can assist in generating a more precise estimate of the position of circuit 700 by decreasing the radius to the known location of the transmitter of the received radio signal.

In one embodiment, the timing information embedded in a plurality of received RBDS signals or other terrestrial radio signals can be used to determine the geographic position of circuit 700 with a greater degree of precision than if a single received signal is used. That is to say, multiple terrestrial FM radio signals may be received and utilized by navigation data deriving component 703 to triangulate or multilaterate a position of circuit 700. Again, while it is possible that this derived geographic position is less precise than if a GNSS receiver is used, it is still sufficiently precise to determine the geographic position of circuit 700 and whether it is currently located within an exclusion zone.

In another embodiment, antenna 701 and terrestrial radio signal reception component 702 receive television broadcast signals which are used by navigation data deriving component 703. The use of received television signals to determine the location of a device is advantageous in urban areas, and especially indoors, because television signals are transmitted at a higher radiated power and because they are broadcast at a frequency which is less attenuated by buildings and other obstructions. Additionally, the television signals are broadcast from fixed locations having known positions and which are located much closer to the receiver (e.g., circuit 700) than a GNSS satellite. Furthermore, both digital and analog television broadcasts contain synchronization signals which can be used to determine the position of circuit 700 with greater precision.

In one embodiment, navigation data deriving component 703 is configured to extract the timing data from received television signals to derive a pseudorange to the transmitter of the received television signal. Navigation data deriving component 703 then uses the station identification data from the received television signal to identify the transmission source of the received signal. Again, navigation data deriving component 703 can access an internal database, or a remote database using wireless communications device 610, which correlates the station identification with the geographic coordinates of the transmitter for that station. Using this information, navigation data deriving component can determine the geographic position of circuit 700 and determine whether it is located within an exclusion zone based upon one received television signal, or can determine its position based upon a plurality of received television signals (triangulation/multilateration). In one embodiment, navigation data deriving component 703 generates a signal to data control component 704 indicating that circuit 700 is located within an exclusion zone.

In one embodiment, terrestrial radio signal reception component 702 is configured to receive cellular telephone tower signals from antenna 701 for processing. For example, terrestrial radio signal reception component 702 can determine the identity of a cellular telephone tower using data embedded in the radio signal from that tower. Using this information, navigation data deriving component 703 can access a database (e.g., second encrypted data set 734) and determine the geographic location of that cellular telephone tower. Navigation data deriving component 703 can then determine the geographic position of circuit 700 using this information. Again, navigation data deriving component 703 can determine the geographic position of circuit 700 with greater precision using a plurality of received signals from a plurality of cellular telephone towers. Furthermore, navigation data deriving component 703 can determine pseudoranges to each of the cellular telephone towers based upon timing data embedded in the radio signal. This can facilitate determining the geographic position of circuit 700 with greater precision. It is noted that the functions served by antenna 701 and terrestrial radio signal reception component 702 can be performed by wireless communication device 610 in one embodiment. In an alternate embodiment, a separate receiver chipset may be incorporated to provide the location determination function. FM receiver chipsets and TV broadcast receiver chipsets are widely available.

In one embodiment, terrestrial radio signal reception component 702 comprises a wireless transceiver compliant with various implementations of the IEEE 802.11 standards. In one embodiment, terrestrial radio signal reception component 702 can determine the identity (e.g., the IP address, name of the WiFi node, etc.) of a WiFi node with which it is communicating. Navigation data deriving component 703 can then compare the IP address with the known location of that WiFi transceiver to determine the geographic position of circuit 700. Given the comparatively small broadcast radius of most WiFi nodes, the geographic position of circuit 700 can be determined with acceptable precision, from a single WiFi signal, in determining whether it is located within an exclusion zone. However, triangulation/multilateration using a plurality of WiFi signals can be accomplished as well. Again, it is noted that the functions served by antenna 701 and terrestrial radio signal reception component 702 can be performed by wireless communication device 610 in one embodiment.

In one embodiment, circuit 700 comprises a non-volatile memory 730 for persistent storage of digital information and instructions for circuit 700. In one embodiment, non-volatile memory 730 is used for storing the operating system for circuit 700. In one embodiment, this may include, but is not limited to, instructions and data for terrestrial radio signal reception component 702, navigation data deriving component 703, data control component 704, and data blocking component 720. In one embodiment, non-volatile memory 730 comprises a Flash memory as described above with reference to FIG. 4, or a field-programmable gate array (FPGA).

In one embodiment, data control component 704 is for blocking the output of a signal from navigation data deriving component 703 in response to determining that circuit 700 is located within an exclusion zone. In one embodiment, navigation data deriving component 703 compares the current geographic position of circuit 700 against a data set (e.g., encrypted data set 731) of coordinates of at least one exclusion zone. In another embodiment, data control component 704 receives the current geographic position of circuit 700 from navigation data deriving component 703 and accesses the encrypted data set 731 for the coordinates defining the exclusion zone(s). Data control component 704 then determines whether circuit 700 is currently located within an exclusion zone. For the purposes of the present technology, an exclusion zone is a geographic region in which GNSS positioning data is not to be made accessible, outside the confines of the packaged circuit of circuit 700.

In response to an indication that circuit 700 is currently located within an exclusion zone, data control component 704 blocks the output of a signal from navigation data deriving component 703. In embodiments of the present technology, data control component 704 can block the output of terrestrial radio signals received from antenna 701, unprocessed position data, or a geographic position derived by navigation data deriving component 703. In so doing, circuit 700 is no longer usable for supplying geographic position data while it is located within an exclusion zone.

In one embodiment, data control component 704 will permanently block the output of a signal from navigation data deriving component 703 in response to an indication that circuit 700 is located within an exclusion zone. For example in one embodiment, data control component 704 is configured such that it cannot be reset once it blocks the output of a signal from navigation data deriving component 703. In other words, once data control component 704 blocks the output of a signal from navigation data deriving component 703, it cannot be reset to later facilitate conveying a signal from navigation data deriving component 703. Thus, once it has been determined that circuit 700 is within an exclusion zone, it is permanently disabled and cannot be used to receive navigation signals, or to output data used for determining a geographic position. In another embodiment, data control component 704 is configured to output a signal to another device (e.g., circuit 300 of FIG. 3) which will disable circuit 700, or otherwise prevent it from outputting a signal. In another embodiment, data control component 704 is configured to output a signal to non-volatile memory 730 such that it can no longer output the data and instructions necessary for circuit 700 to function as described above with reference to FIG. 4. Alternatively, if non-volatile memory 730 comprises a FPGA, data control component can initiate a process which re-programs the FPGA and renders it unable to output the data and instructions necessary for circuit 700 to function. For example, circuit 700 may apply a programming voltage to the FPGA, such that one or more portions (or all) of the FPGA can be destroyed or rendered inoperable when more fusible links or circuit features within the FPGA can be reprogrammed or "blown" by the applied programming voltage.

In another embodiment, data control component 704 only blocks the output of a signal from navigation data deriving component 703 while circuit 700 is currently located in an exclusion zone. In other words, if circuit 700 is moved from an exclusion zone to an area outside of the exclusion zone, data control component 704 will permit navigation data deriving component 703 to output a signal via position data serial port 705. It is noted that data control component 704 may be implemented within navigation data deriving component 703 in one embodiment of the present technology.

In another embodiment, data control component 704 can be used to block the output of other data from circuit 700. For example, data from electronic device 600 can be routed through circuit 700 to control and/or disable various functions when electronic device 600 is located within an exclusion zone. For example, in some countries the sending of encrypted text messages is prohibited. In one embodiment, encrypted text messages can be routed through circuit 700 via encrypted data set input 785 and encrypted data set output 786. If it is determined that circuit 700 is located within an exclusion zone (e.g., a country that does not permit encrypted text messaging) the output of encrypted text messages from circuit 700 is blocked by data control component 704. In the example of a cellular telephone, received radio signals from a cellular transmitter, or radio signals to be transmitted by electronic device 600 can be routed through circuit 700 and blocked when it is determined that circuit 700 is located in an exclusion zone. In another embodiment, data control component 704 can output a signal via encrypted data set output 786 which is received by processor 602 of electronic device 600. This signal will indicate to processor 602 that electronic device 600 is located within an exclusion zone. Using this information, processor 602 can control which functions are permitted. Again using the example of a cellular telephone, in response to a signal from circuit 700 a cellular telephone (e.g., electronic device 600) can block the reception of radio signals from a cellular telephone transmitter, or block the transmission of radio signals, thus rendering the cellular telephone unusable while located in the exclusion zone.

In one embodiment, encrypted data set 731 and second encrypted data set 734 are stored in a non-volatile memory 730. In one embodiment, non-volatile memory 730 comprises a read-only memory (ROM) device. In other words, encrypted data set 731 and second encrypted data set 734 are permanently stored in non-volatile memory 730 and cannot be updated. In another embodiment, non-volatile memory 730 comprises a programmable memory device such as a Flash memory or the like. Thus, in one embodiment, encrypted data set 731 can be updated to include additional exclusion zones as they are identified, or to remove exclusion zones as desired. Additionally, second encrypted data set 734 can be updated to add or remove transmission sources, or to add data which can further refine determining the position of circuit 700.

In the embodiment of FIG. 7, navigation data deriving component 703 and data control component 704 are communicatively coupled with non-volatile memory 730 via a data blocking component 720. Data blocking component 720 controls the accessing of encrypted data set 731 and second encrypted data set 734 from non-volatile memory 730. In general, data blocking component 704 is configured to authenticate the integrity of encrypted data set 731 and prevent alteration of the exclusion zones. As shown in FIG. 7, data blocking component 720 comprises a verification data determining component 721, and a verification data comparison component 722, which are used to verify authenticity of data. The verification data value may be a checksum value or other well known verification data such as, but not limited to: a hash value, a parity value, or a value or result output from carrying out an error detection/correction technique such as Hamming code.

In one embodiment, verification data determining component 721 is for determining the verification data value 721a of encrypted data set 731 and for determining the verification data value 721b of second encrypted data set 734. This verification data value 721a, or 721b, is then passed to verification data comparing component 722 which compares the verification data value 721a/721b with a verification data value 732 stored in non-volatile memory 730 to verify authenticity. In one embodiment, verification data value 732 is a verification data value of encrypted data set 731 when it is first stored in non-volatile memory 730. In one embodiment, verification data value 737 is a verification data value of second encrypted data set 734 when it is first stored in non-volatile memory 730. If encrypted data set 731, or second encrypted data set 734, is then altered after it has been stored in non-volatile memory 730, verification data value 721a, or verification data value 721b respectively, will no longer match the verification data value 732 as determined by verification data determining component 721. Thus, verification data comparing component 722 can determine if encrypted data set 731, or second encrypted data set 734, has been altered after it has been stored in non-volatile memory 730.

In one embodiment of the present technology, if verification data comparing component 722 determines that verification data value 721a does not match the verification data value 732, data blocking component 720 will prevent accessing of encrypted data set 731 by navigation data deriving component 703 and/or data control component 704. Similarly, if verification data comparing component 722 determines that verification data value 721b does not match the verification data value 737, data blocking component 720 will prevent accessing of second encrypted data set 734 by navigation data deriving component 703 and/or data control component 704. In one embodiment, if data control component 704 cannot access encrypted data set 731 or second encrypted data set 734, it automatically blocks the output of a signal from navigation data deriving component 703. In so doing, embodiments of the present technology can authenticate the integrity of encrypted data set 731 and prevent alteration of the exclusion zones. Additionally, embodiments of the present technology can authenticate the integrity of second encrypted data set 734 and prevent alteration of the database which provides the geographic position of terrestrial radio transmitters. Thus, if an entity tries to circumvent the exclusion zone features of circuit 700 by changing the coordinates of one or more exclusion zones, data blocking component 720 renders circuit 700 unusable because necessary data for determining the geographic position of circuit 700 is not accessible. Similarly, if an entity tries to circumvent the exclusion zone features of circuit 700 by changing the coordinates of one or more terrestrial radio transmitters, data blocking component 720 renders circuit 700 unusable because necessary data for determining the geographic position of circuit 700 is not accessible.

In the embodiment of FIG. 7, data blocking component 720 comprises a date comparison component 723 for comparing a date associated with encrypted data set 731 with a second date corresponding to a valid data set. In one embodiment of the present technology, a date 731a is associated with encrypted data set 731 which facilitates determining whether a valid, or current, data set is used to define exclusion zones. It is noted that date 731a can comprise a day, week, month, and year in one embodiment. In one embodiment, encrypted data set 731 is required to be periodically updated in order to reflect any changes to the coordinates of the exclusion zones. As described above, this may include adding more exclusion zones, or removing some exclusion zones. In one embodiment, an updated data set may be received via a wireless network. In another embodiment, an updated data set may require that a removable data storage medium (e.g., a Smart Card, Universal Serial Bus (USB) drive, SmartMedia card, MultiMedia card, MicroDrive™ device, CompactFlash™ device, MemoryStick device, SecureDigital card, optical data storage device, or the like) is communicatively coupled with navigation data deriving component 703 via encrypted data set input 128. Circuit 700 can receive clock time data via encrypted data set inputs 728 and/or 785 (e.g., from processor 602 of electronic device 600), or from signals embedded within the received terrestrial radio signal. Additionally, in the embodiment of FIG. 7, data blocking component 720 comprises a time comparison component 727 for comparing a time associated with encrypted data set 731 with a second time corresponding to a valid data set.

In one embodiment, date comparison component 723 and time comparison component 727 can be used to prevent the output of time sensitive data via circuit 700. For example, an exclusion zone list may only be valid until a certain date or time. In one embodiment, the exclusion zone list is encrypted and stored in non-volatile memory 730 as an encrypted data set (e.g., encrypted data set 731). In one embodiment, date comparison component 723 and/or time comparison component 727 compares the current date and/or time with a date or time attribute of the encrypted data set 731 which describes when the encrypted data set 731 expires, or is no longer to be made available. In one embodiment, when date comparison component 723 and/or time comparison component 727 determines that the encrypted data set 731 has expired, it will generate a signal to data control component 704. In response, data control component 704 blocks the output of the encrypted data set 731. In one embodiment, date comparison component 723 and/or time comparison component 727 flags the encrypted data set 731 which marks it as an expired data set.

In one embodiment of the present technology, date comparison component 723 determines whether date 731a corresponds with a valid data set. Similarly, time comparison component 727 determines whether time 731c, which is associated with encrypted data set 731, corresponds with a valid data set. For example, if there is a requirement to update encrypted data set 731 monthly, date comparison component 723 determines whether encrypted data set 731 has been updated within the last month. Similarly, if there is a requirement that encrypted data set 731 expires at a certain time, or is not to be accessed during a specified time period, time comparison component 727 determines whether encrypted data set 731 has expired, or cannot be accessed at the current time. In one embodiment, if date comparison component 723 and/or time comparison component 727 determines that encrypted data set 731 is not a valid data set, data blocking component 720 will prevent accessing of encrypted data set 731 by navigation data deriving component 703 and/or data control component 704. Again, this will prevent the operation of circuit 700. Thus, if an entity tries to circumvent an exclusion zone restriction by using an older data set, circuit 700 will be rendered unusable. Additionally, data blocking component 720 may also prevent accessing of software instructions 733 by navigation data deriving component 703 and/or data control component 704 as well. In embodiments of the present technology, software instructions 733 may comprise an encryption/decryption algorithm used to encrypt and/or decrypt encrypted data set 731.

In FIG. 7, circuit 700 further comprises an encryption key comparator 724 for comparing a stored encryption key 725 with an encryption key 731b associated with encrypted data set 731. In one embodiment, encrypted data set 731 is encrypted using standard encryption techniques, e.g., Message Digest algorithm 5 (MD-5), Secure Hash Algorithms (SHA), etc. In one embodiment, a private key (e.g., encryption key 725) is loaded into circuit 700 during production. Thus, encryption key 725 is inaccessible to a user of circuit 700. In one embodiment, encryption key 725 may comprise a portion of a larger encrypted sequence stored in circuit 700. For example, a 64-bit sequence may be stored. However, encryption key 725 may only comprise a 32-bit sequence within that 64-bit sequence. This makes it harder for an end user to determine what portion of the stored sequence is the actual encryption key 725. It is noted that encryption key 725 may be stored in navigation data deriving component 703, non-volatile memory 730, or volatile memory 190 in embodiments of the present technology. It is further noted the volatile memory 190 can also be used to store data and instructions for navigation data deriving component 703 and data control component 704. It is noted that a similar operation can be performed using second encryption key 726 which is compared with encryption key 734b associated with second encrypted data set 734.

In one embodiment of the present technology, encryption key comparator 724 compares stored encryption key 725 with encryption key 731b prior to loading encrypted data set 731 into non-volatile memory 730. In one embodiment, encryption key comparator 724 compares second encryption key 726 with encryption key 734b prior to loading second encrypted data set 734 into non-volatile memory 730. In one embodiment, encryption key 731b is used to encrypt encrypted data set 731 prior to it being loaded into non-volatile memory 730 via encrypted data set input 128. In one embodiment, stored encryption key 725, second encryption key 726, encryption key 731b, and encryption key 734b are encrypted themselves. In one embodiment, if stored encryption key 725 does not match encryption key 731b which is within encrypted data set 731, data blocking component 720 prevents the loading of encrypted data set 731 into non-volatile memory 730. Similarly, in one embodiment, if stored encryption key 726 does not match encryption key 734b which is within second encrypted data set 734, data blocking component 720 prevents the loading of second encrypted data set 734 into non-volatile memory 730. If stored encryption key 725 does match encryption key 731b which is within encrypted data set 731, encryption key 725 is used to decrypt encrypted data set 731 prior to its being accessed by navigation data deriving component 703 and/or data control component 704. This facilitates authenticating encrypted data set 731 prior to loading it into non-volatile memory 730. Similarly, if stored encryption key 726 does match encryption key 734b which is within encrypted data set 734, encryption key 726 is used to decrypt encrypted data set 734 prior to its being accessed by navigation data deriving component 703 and/or data control component 704.

In FIG. 7, circuit 700 comprises an encrypted data set input 785 and an encrypted data set output 786 which are communicatively coupled via data control component 704. In one embodiment, circuit 700 can be used to control the output of data from a device to which circuit is communicatively coupled. For example, circuit 700 can be communicatively coupled with a cellular telephone, a handheld computer system such as a Personal Digital Assistant (PDA), a laptop computer system, a general purpose computer system, or other electronic device. In one embodiment, data from a device to which circuit 700 is coupled passes through circuit 700 prior to its output. Thus, data cannot be displayed, downloaded, shared, copied, or accessed unless it passes via circuit 700 first. In one embodiment, circuit 700 can be used to control the output of data from an electronic device to which it is coupled. For example, in one embodiment circuit 700 can be used to prevent the output of data based upon the geographic position determined by navigation data deriving component 703. In other words, if it is determined that circuit 700 is within an exclusion zone, the output of data from circuit 700 will be blocked by data control component 704.

In one embodiment, the data blocked by data control component 704 comprises, but is not limited to, navigation data from navigation data deriving component 703, data stored in volatile memory 190, data stored in non-volatile memory 730, or data which is input to circuit 700 via encrypted data set input 165. In one embodiment, the encryption key used to decrypt data input from encrypted data input 785 is stored in circuit 700. As described above, circuit can be used to decrypt an encrypted data set determining whether a stored data set has been altered subsequent to its being stored in circuit 700. It is noted that there is no requirement for data input via encrypted data set input 785 to be encrypted in one embodiment. Again, the data described above may be blocked from being output by circuit 700 based upon the date, or current time, or based upon the speed at which circuit 700 is moving, or a combination thereof in one embodiment. The use of date, time, and/or speed to determine whether data is output by circuit 700 can be used in conjunction with a geographic position of circuit 700 in one embodiment.

In FIG. 7, circuit 700 comprises a speed determining component 770. In one embodiment, speed determining component 770 is configured to determine the speed of circuit 700. In one embodiment, speed determining component 770 receives position data from navigation data deriving component 703 and determines if circuit is exceeding a pre-determined speed threshold. For example, in one embodiment speed determining component 770 can receive successive measurements of the geographic position of circuit 700 from navigation data deriving component 703. Based upon the time interval of the successive measurements of geographic position, speed determining component 770 can then determine the speed of circuit 700. It is noted that other methods may be used by speed determining component 770 as well. For example, speed determining component 770 may also be configured to determine the speed of circuit 700 based upon an analysis of the Doppler shift of received terrestrial radio signals due to motion of circuit 700. The speed of circuit 700 is compared with a pre-determined speed threshold to determine if circuit 700 is moving, or is moving faster than the speed threshold. It is noted that the speed threshold can be set to comply with export control regulations. For example, in one embodiment the speed threshold is set at a minimum of 600 meters/second. It is noted that the speed threshold can be set at a limit lower than 600 meters/second. For example, if speed threshold is set at a speed of 8 miles per hour, it may be assumed that circuit 700 is disposed in a moving vehicle when its speed exceeds 8 miles per hour. Alternatively, it may be assumed that the user of circuit 700 is engaged in an activity which requires a greater attention to safety. In one embodiment, speed determining component 770 uses signal generator 775 to generate a signal to data control component 704 when the speed of circuit 700 exceeds the speed threshold. In response to the signal from speed determining component 770 data control component 704 blocks the output of a signal from circuit 700.

In FIG. 7, data blocking component 720 comprises verification data determining component 721, verification data value 721a, verification data comparison component 722, date comparison component 723, encryption key comparator 724, and encryption key 725. Circuit 700 further comprises encrypted data set input 785 and an encrypted data set output 786. Circuit 700 further comprises speed determining component 770. In FIG. 7, circuit 700 further comprises an altitude limiting component 195. In one embodiment, altitude limiting component 195 is configured to receive an indication of the altitude of circuit 700 from navigation data deriving component 703 and for comparing that altitude with a stored altitude threshold value. It is well known in the art that a GNSS receiver (e.g., navigation data deriving component 703) can also derive the altitude of a device based upon a plurality of received satellite navigation signals. In the embodiment of FIG. 7, altitude limiting component 195 generates a signal when the altitude of circuit 700 exceeds a pre-set altitude threshold. As an example, export control regulations have restricted the export of navigation devices to devices with an altitude limit of no more than 18,000 meters. Thus, altitude limiting component 195 can be configured to generate a signal when it determines that the altitude of circuit 700 exceeds 18,000 meters. It is noted that the altitude threshold can be set to a lower altitude if so desired. In one embodiment, the altitude threshold cannot be modified after manufacture. In response to the signal generated by altitude limiting component 195, data control component 704 blocks the output of a signal from circuit 700.

It is noted that data blocking component 720 may comprise other combinations of components described above with reference to FIGS. 1C, 1D, and 1E. For example, in one embodiment data blocking component 720 comprises verification data determining component 721, verification data value 721a, verification data comparison component 722, and date comparison component 723. In one embodiment, data blocking component 720 comprises verification data determining component 721, verification data value 721a, verification data comparison component 722, encryption key comparator 724, and encryption key 725. In one embodiment, data blocking component 720 comprises date comparison component 723, encryption key comparator 724, and encryption key 725. It is further noted that circuit 700 can comprise multiple implementations of components described above. For example, one terrestrial radio signal reception component 702 can be configured for receiving and processing FM radio signals while a second terrestrial radio signal reception component 702 can be configured for receiving and processing television signals. Additionally, multiple implementations of non-volatile memory 730, data blocking component 720, and data control component 704 can be used in accordance with various embodiments. In another embodiment, components of circuit 100 (e.g., satellite navigation signal reception component 102 as well as associated data and instructions) can be disposed on circuit 700 to allow exclusion zone enforcement based upon satellite or terrestrial radio signals on a single circuit.

Thus, embodiments of the present technology can facilitate the export of an electronic device and/or data accessible via circuit 700 while reducing the likelihood that it can be misused by, for example, commercial entities, rogue nations, or other groups. Circuit 700 may operate anywhere in the world and the exclusionary zone may be located anywhere in the world. In another embodiment, sensitive data will not be accessible unless circuit 700 is located outside of an exclusion zone. In another embodiment, time sensitive data will not be accessible via circuit 700 when the time period for accessing that data has expired. In another embodiment, circuit 700 can be used to prevent the accessing of data, including geographic data, or data used to determine a geographic position, if circuit 700 is moving, or is moving faster than a pre-determined speed threshold. This facilitates implementing weapons proliferation controls as circuit 700 cannot be altered for use as, for example, a weapons guidance system, or used in a manner which circumvents a commercial agreement. Thus, even if an unintended third party should gain control of a properly exported version of circuit 700, that third party cannot use or alter circuit 700 for use within a designated exclusion zone. In another embodiment, circuit 700 can be used to control which functions of an electronic device are permitted based upon its geographic position. Additionally, in embodiments of the present technology, the designated exclusion zones may be dynamically updated to reflect changed relations. Thus, it is also possible to quickly redefine one or more of the exclusion zones to permit operation of circuit 700 within that zone. For example, if it is determined that a nation or region is to no longer be excluded from using circuit 700, the definition of which geographic regions are considered exclusion zones can be updated to reflect the new status of that nation. Alternatively, if a nation decides to permit or limit the use of a given technology, the exclusion zones defined in circuit 700 can be updated to reflect those changes.

FIG. 8 is a flowchart of a method 800 for enforcing exclusion zone compliance in accordance with an embodiment of the present technology. In operation 801, a terrestrial radio signal, comprising a unique identification of a transmission source of the terrestrial radio signal, is received by a terrestrial radio signal reception component of an exclusion zone circuit. As described above, terrestrial radio signal reception component can utilize a variety of terrestrial-based radio signals to assist in establishing the geographic position of circuit 700. These can include, but are not limited to, cellular telephone signals, FM radio signals, television signals, and wireless signals compliant with the IEEE 802.11 standards.

In operation 802, a data set is accessed comprising the unique identification of the transmission source and a known geographic position of the transmission source. The received unique identification of the transmission source is compared with the station identification of the transmission source stored in the data set. In one embodiment, navigation data deriving component 703 can initiate communications with a database which correlates the unique identification of the transmitter of a received terrestrial radio signal with the known geographic position of that transmitter. In one embodiment the database is a remotely located database which can be accessed via a wireless communications network using wireless communication device 610. In another embodiment, the database is stored within electronic device 600. In one embodiment, the database is stored within non-volatile memory 730 as an encrypted data set (e.g., second encrypted data set 734). In one embodiment, navigation data deriving component 703 compares the received unique identification of the transmission source with the station identifications stored in the data set and determines which station identification matches the received unique identification. When a match is detected, navigation data deriving component 703 then retrieves the known geographic position of the transmission source for deriving the position of circuit 700.

In operation 803, a geographic position of the exclusion zone compliance circuit is derived based upon the known geographic position of the transmission source. As described above, navigation data deriving component 703 is configured to determine the geographic position of circuit 700 based upon the terrestrial radio signal received and the geographic position of the transmitter of the received radio signal. In one embodiment, determining the geographic position of circuit 700 comprises determining that circuit 700 is within a given radius of the transmitter of the received radio signal. In another embodiment, navigation data deriving component 703 can use timing data embedded within the received terrestrial radio signal to determine the geographic position of circuit 700. Furthermore, navigation data deriving component 703 can utilize a plurality of received terrestrial radio signals to determine the geographic position of circuit 700 with greater precision (e.g., by triangulation).

In operation 804, a non-volatile memory component is used to store an encrypted data set describing boundaries of an exclusion zone. As described above, non-volatile memory 730 is used to store encrypted data describing the boundaries of exclusion zones and can also store encrypted data which correlates the unique identification of the transmitter of a received terrestrial radio signal with the known geographic position of that transmitter. This helps to ensure the integrity of the data to prevent circumventing exclusion zone enforcement.

In operation 805, a data blocking component is used to control the accessing of the encrypted data set. As described above, data blocking component 720 controls accessing encrypted data, and other data, stored on non-volatile memory. Again, this helps to ensure the integrity of the data stored in non-volatile memory 730 to prevent circumventing exclusion zone enforcement.

In operation 806, a data control component is used to block the output of a signal from the exclusion zone compliance circuit in response to an indication that the exclusion zone compliance circuit is located within an exclusion zone. As described above, data control component is configured to block the output of a signal when it is determined that exclusion zone compliance circuit 700 is within an exclusion zone. In one embodiment, data from electronic device 600 can be routed through circuit 700 to prevent the output of data, or to control functions of electronic device 600, when electronic device 600 is located within an exclusion zone. In another embodiment, data control component 704 can output a signal to processor 602 when circuit 700 is within an exclusion zone. This permits processor 602 to control functions of electronic device 600 based upon whether electronic device 600 is within an exclusion zone.

Figure 9:
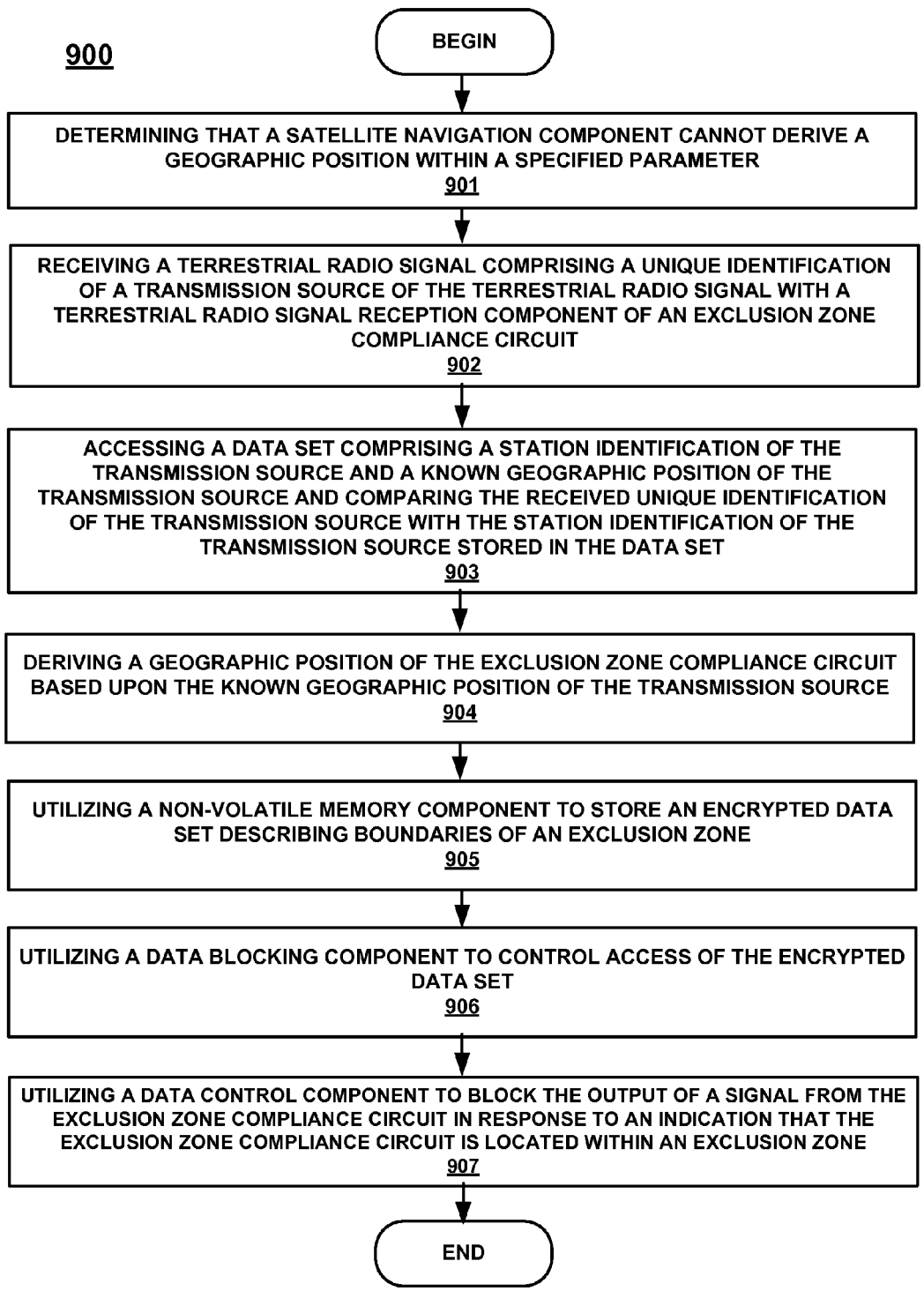
FIG. 9 is a flowchart of a method for applying exclusion zone compliance in accordance with an embodiment of the present technology.

FIG. 9 is a flowchart of a method 900 for enforcing exclusion zone compliance in accordance with an embodiment of the present technology. In operation 901, it is determined that a satellite navigation component cannot derive a geographic position within a specified parameter. In one embodiment, if processor 602 of FIG. 6 determines that exclusion zone compliance circuit 100 cannot derive a geographic position of electronic device 600 within a specified parameter, it will shift enforcement of exclusion zone compliance to circuit 700. Examples of parameters used to determine whether circuit 100 can derive a geographic position in a satisfactory manner include, but are not limited to, determining if navigation satellite signals can be received by circuit 100, whether the signal strength of the signals is sufficient, and the amount of time it takes for circuit 100 to derive a geographic position, determining that circuit 100 is disposed within a pre-determined geographic area, and determining that the velocity of circuit 100 exceeds a pre-determined velocity. If processor 602 determines that one of these parameters is not met, it can shift control of exclusion zone compliance to circuit 700. In another embodiment, when satellite navigation signal reception is implemented on circuit 700, navigation data deriving component 703 may determine that the geographic position of circuit 700 cannot be determined within desired parameters and switch to using terrestrial radio signal reception component 702 instead.

In operation 902, a terrestrial radio signal, comprising a unique identification of a transmission source of the terrestrial radio signal, is received by a terrestrial radio signal reception component of an exclusion zone circuit. As described above, terrestrial radio signal reception component can utilize a variety of terrestrial-based radio signals to assist in establishing the geographic position of circuit 700. These can include, but are not limited to, cellular telephone signals, FM radio signals, television signals, and wireless signals compliant with the IEEE 802.11 standards.

In operation 903, a data set is accessed comprising the unique identification of the transmission source and a known geographic position of the transmission source. The received unique identification of the transmission source is compared with the station identification of the transmission source stored in the data set. In one embodiment, navigation data deriving component 703 can initiate communications with a database which correlates the unique identification of the transmitter of a received terrestrial radio signal with the known geographic position of that transmitter. In one embodiment the database is a remotely located database which can be accessed via a wireless communications network using wireless communication device 610. In another embodiment, the database is stored within electronic device 600. In one embodiment, the database is stored within non-volatile memory 730 as an encrypted data set (e.g., second encrypted data set 734). In one embodiment, navigation data deriving component 703 compares the received unique identification of the transmission source with the station identifications stored in the data set and determines which station identification matches the received unique identification. When a match is detected, navigation data deriving component 703 then retrieves the known geographic position of the transmission source for deriving the position of circuit 700.

In operation 904, a geographic position of the exclusion zone compliance circuit is derived based upon the known geographic position of the transmission source. As described above, navigation data deriving component 703 is configured to determine the geographic position of circuit 700 based upon the terrestrial radio signal received and the geographic position of the transmitter of the received radio signal. In one embodiment, determining the geographic position of circuit 700 comprises determining that circuit 700 is within a given radius of the transmitter of the received radio signal. In another embodiment, navigation data deriving component 703 can use timing data embedded within the received terrestrial radio signal to determine the geographic position of circuit 700. Furthermore, navigation data deriving component 703 can utilize a plurality of received terrestrial radio signals to determine the geographic position of circuit 700 with greater precision.

In operation 905, a non-volatile memory component is used to store an encrypted data set describing boundaries of an exclusion zone. As described above, non-volatile memory 730 is used to store encrypted data describing the boundaries of exclusion zones and can also store encrypted data which correlates the unique identification of the transmitter of a received terrestrial radio signal with the known geographic position of that transmitter. This helps to ensure the integrity of the data to prevent circumventing exclusion zone enforcement.

In operation 906, a data blocking component is used to control the accessing of the encrypted data set. As described above, data blocking component 720 controls accessing encrypted data, and other data, stored on non-volatile memory. Again, this helps to ensure the integrity of the data stored in non-volatile memory 730 to prevent circumventing exclusion zone enforcement.

In operation 907, a data control component is used to block the output of a signal from the exclusion zone compliance circuit in response to an indication that the exclusion zone compliance circuit is located within an exclusion zone. As described above, data control component is configured to block the output of a signal when it is determined that exclusion zone compliance circuit 700 is within an exclusion zone. In one embodiment, data from electronic device 600 can be routed through circuit 700 to prevent the output of data, or to control functions of electronic device 600, when electronic device 600 is located within an exclusion zone. In another embodiment, data control component 704 can output a signal to processor 602 when circuit 700 is within an exclusion zone. This permits processor 602 to control functions of electronic device 600 based upon whether electronic device 600 is within an exclusion zone.

Figure 11:
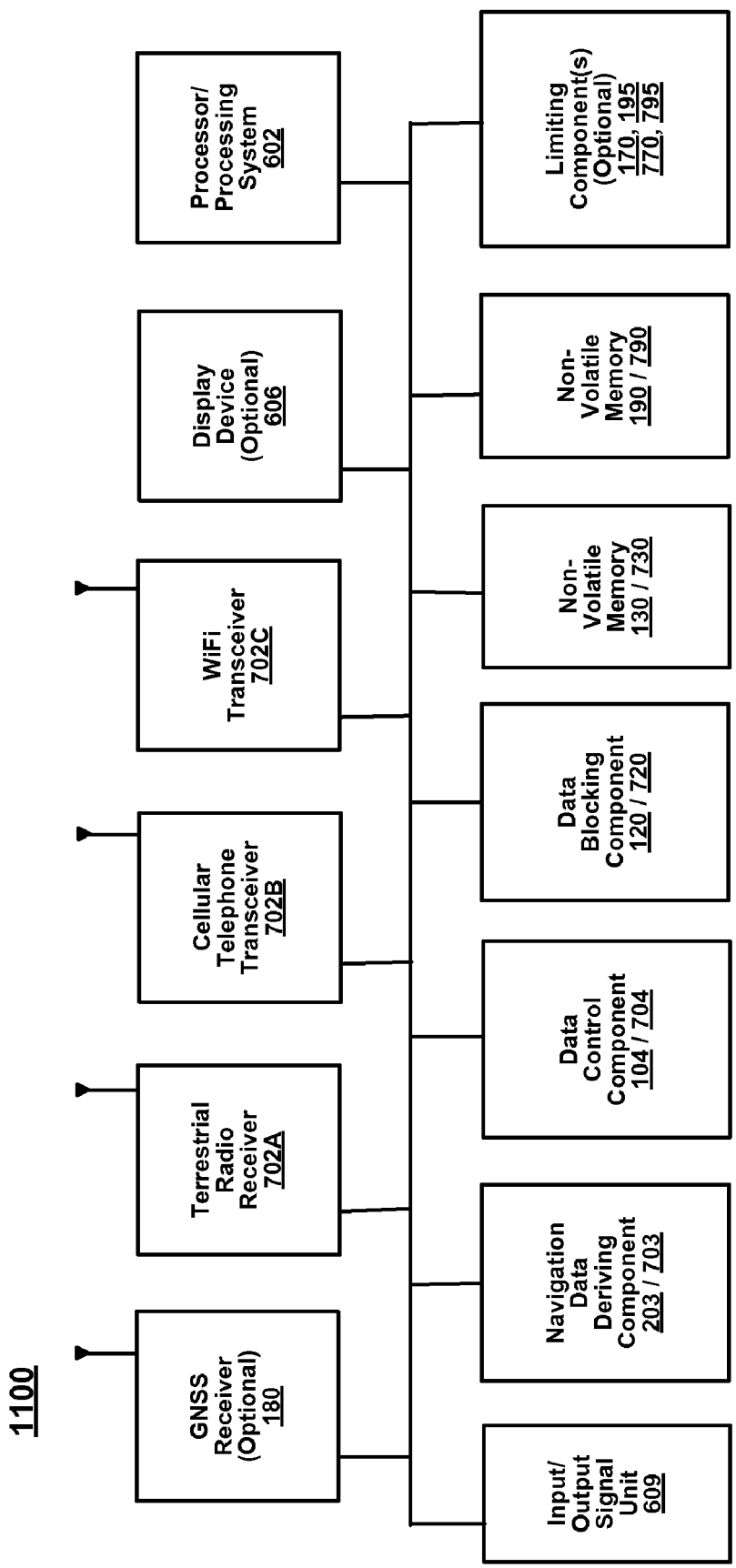
FIG. 11 is a high level functional block diagram of an electronic device which includes features of a circuit for implementing exclusion zone compliance, in accordance with various embodiments of the present technology.

FIG. 11 is a high level functional block diagram of an electronic device 1100 which includes features of a circuit for implementing exclusion zone compliance, in accordance with various embodiments of the present technology. Electronic device 1100 may, in various embodiments carry out one or more or all of the operations described flow chart 800 and/or one or more or all of the operations described in flow chart 900.

By way of example and not of limitation, in various embodiments, electronic device 1100 may be: a position determining device (e.g., a surveying instrument), a personal navigation device, a navigation device coupled with a vehicle, a personal digital assistant, a cellular telephone, a VOIP (voice over internet protocol) telephone, a personal computer, a net book, a tablet computer, a hand held multimedia device, a pager, or some of the preceding electronic devices. As illustrated, electronic device 1100 includes one or more terrestrial radio receiving components 702 (e.g., one or more of Terrestrial radio receiver 702A (which receives FM and/or television signals); cellular telephone transceiver 702B; and WiFi transceiver 702C). Electronic device 1100 also includes a processor 602 (e.g., a microcontroller or microprocessor), an input output signal unit 609 (which may be used for input/output of encrypted data sets or other data such as positional data), a navigation data determining component 703 (which may included some or all features of navigation determining component 203), a data control component 704 (which may include some or all features of data control component 104, a data blocking component 720 (which may include some or all features of data blocking component 120), a non-volatile memory 730 (which may include some or all features of volatile memory 130), and a volatile memory 790 (which may include some or all features of volatile memory 190). In some embodiments, electronic device may additionally include one or more of GNSS receiver 180, display device 106, and limiting components 770 and/or 795 (which may include some or all features of speed determining component 170 and/or altitude limiting 195).

In an electronic device such as electronic device 1100, multiple types of position determination may be utilized in a hybrid position determining approach. For example, electronic device may initially attempt to determine position utilizing one or more received WiFi signals and then alternatively or additionally determine position utilizing received cell tower signal(s), received FM radio signal(s), and/or received television station signal(s), or some combination thereof. In some embodiments this hybrid approach to position determination also utilizes received GNSS signals, when available and when electronic device 1100 is equipped with GNSS receiver 190.

Embodiments of the present technology, terrestrial-signal based exclusion zone compliance, are thus described. While the present technology has been described in particular embodiments, it should be appreciated that the present technology should not be construed as limited by such embodiments, but rather construed according to the following claims.

What is claimed is:

1. An exclusion zone compliance circuit, said circuit comprising:
    a terrestrial radio signal reception component configured for receiving a terrestrial radio signal, said terrestrial radio signal comprising a unique identification of a transmission source of said terrestrial radio signal;
    a non-volatile memory component configured for storing an encrypted data set describing boundaries of an exclusion zone;
    a navigation data deriving component communicatively coupled with said terrestrial radio signal reception component, said non-volatile memory, and with a data set and compares said unique identification of said transmission source with a station identification of said transmission source and a known geographic position of said transmission source, said navigation data deriving component configured for deriving a geographic position of said exclusion zone compliance circuit based upon said known geographic position of said transmission source and to determine whether said geographic position of said exclusion zone compliance circuit is located within said exclusion zone;
    a data blocking component communicatively coupled with said non-volatile memory component and navigation data deriving component, said data blocking component configured for controlling access of said encrypted data set; and
    a data control component configured for blocking output of a signal from said circuit in response to an indication that said exclusion zone compliance circuit is located within said exclusion zone.

2. The circuit of claim 1 wherein said non-volatile memory component is selected from the group consisting of a read-only memory component and a programmable memory component.

3. The circuit of claim 1 wherein said circuit comprises an integrated circuit.

4. The circuit of claim 1 wherein said data blocking component is configured to verify authenticity of said encrypted data set.

5. The circuit of claim 1 wherein said data blocking component further comprises:
    a verification data determining component configured for determining a verification data value based upon said encrypted data set; and
    a verification data comparison component communicatively coupled with said verification data determining component, said verification data comparison component configured for comparing a second verification data value by said non-volatile memory component stored with said verification data value and wherein said data blocking component prevents said navigation data deriving component from accessing said encrypted data set when said verification data comparison component determines that said verification data value does not match said second verification data value.

6. The circuit of claim 5 further comprising:
    an encrypted data set input communicatively coupled with said non-volatile memory component configured for receiving an updated encrypted data set.

7. The circuit of claim 6 wherein said data blocking component further comprises:
    a date comparison component configured for comparing a date associated with said updated encrypted data set with a second date corresponding to a valid encrypted data set and wherein said data blocking component is further configured for preventing said navigation data deriving component from accessing said updated encrypted data set when said date comparison component determines that said date associated with said updated encrypted data set does not match said second date corresponding to a valid encrypted data set.

8. The circuit of claim 6 wherein said data blocking component further comprises:
    a time comparison component configured for comparing a time associated with said updated encrypted data set with a second time corresponding to a valid encrypted data set and wherein said data blocking component is further configured for preventing said navigation data deriving component from accessing said updated encrypted data set when said time comparison component determines that said time associated with said updated encrypted data set does not match said second time corresponding to a valid encrypted data set.

9. The circuit of claim 6 further comprising:
    a second encrypted data set input communicatively coupled with said data control component and configured for receiving a second encrypted data set; and
    an encrypted data set output communicatively coupled with said data control component.

10. The circuit of claim 6 wherein said data blocking component further comprises:
    an encryption key comparator configured for comparing a stored encryption key with an encryption key associated with said updated encrypted data set and wherein said data blocking component is further configured for preventing a loading of said updated encrypted data set into said non-volatile memory component when said stored encryption key does not match said encryption key associated with said updated encryption data set.

11. The circuit of claim 5, wherein said verification data value comprises a checksum value and wherein said second verification data value comprises a second checksum value.

12. The circuit of claim 1 further comprising:
    a speed determining component configured to determine a speed of said circuit and wherein said signal generating component is further configured to generate a signal in response to an indication that a speed threshold of said circuit is exceeded; and
    an altitude determining component configured for comparing an altitude of said circuit with an altitude threshold and for outputting an altitude exceeding signal when said altitude exceeds an altitude threshold and wherein said signal generating component is further configured to generate a signal in response to an indication that said altitude threshold of said circuit is exceeded.

13. The circuit of claim 1 wherein said circuit is disposed within a device further comprising a satellite-signal-based exclusion zone compliance device which is configured to generate a signal indicating that it cannot currently derive a geographic position within a specified parameter.

14. The circuit of claim 1 wherein said circuit is disposed within a cellular telephone and wherein said signal from said data control component controls a function of said cellular telephone.

15. The circuit of claim 14 wherein said signal from said data control component prevents said cellular telephone from receiving a radio transmission.

16. The circuit of claim 14 wherein said signal from said data control component prevents said cellular telephone from transmitting a radio signal.

17. The circuit of claim 1 wherein said data control component is configured to output a signal which disables said circuit in response to determining that said circuit is located within said exclusion zone.

18. The circuit of claim 1 wherein said data set comprising said unique identification of said transmission source and said known geographic position of said transmission source comprises a second encrypted data set which is stored on said non-volatile memory component.

19. A method for implementing exclusion zone compliance, said method comprising:
    receiving a terrestrial radio signal with a terrestrial radio signal reception component of an exclusion zone compliance circuit, said terrestrial radio signal comprising a unique identification of a transmission source of said terrestrial radio signal;
    accessing by a navigation data deriving component a data set disposed within said exclusion zone compliance circuit comprising a station identification of said transmission source and a known geographic position of said transmission source and comparing said received unique identification with said station identification of said transmission source stored in said data set;
    deriving a geographic position of said exclusion zone compliance circuit based upon said known geographic position of said transmission source;
    utilizing a non-volatile memory component of said exclusion zone compliance circuit to store an encrypted data set describing boundaries of an exclusion zone;
    utilizing a data blocking component of said exclusion zone compliance circuit communicatively coupled with said non-volatile memory component to control access of said encrypted data set; and
    utilizing a data control component of said circuit to block output of a signal from said exclusion zone compliance circuit in response to an indication that said exclusion zone compliance circuit is located within said exclusion zone.

20. The method of claim 19 further comprising:
    generating a signal by said data control component which causes said exclusion zone compliance circuit to become disabled in response to said indication.

21. The method of claim 19, further comprising:
    in response to said indication, selectively disabling operation of a portion of a cellular telephone in which said exclusion zone compliance circuit is disposed.

22. The method of claim 21 further comprising:
    blocking the reception by said cellular telephone of a radio transmission.

23. The method of claim 21 further comprising:
    blocking the transmission by said cellular telephone of a radio signal.

24. The method of claim 19 further comprising:
    generating a signal in response to an indication that a speed threshold of said circuit is exceeded; and
    generating a second signal in response to an indication that an altitude threshold of said exclusion zone compliance circuit is exceeded.

25. The method of claim 19 wherein utilizing said non-volatile memory component further comprises:
    utilizing a non-volatile memory component selected from the group consisting of a read-only memory component and a programmable memory component.

26. The method of claim 19 wherein utilizing said data blocking component further comprises:
    verifying authenticity of said encrypted data set.

27. The method of claim 19 wherein utilizing said data blocking component further comprises:
    utilizing a verification data determining component for determining a verification data value based upon said encrypted data set; and
    utilizing a verification data comparison component communicatively coupled with said verification data determining component for comparing a second verification data value stored by said non-volatile memory component with said verification data value; and
    utilizing said data blocking component to prevent said navigation data deriving component from accessing said encrypted data set when said verification data comparison component determines that said verification data value does not match said second verification data value.

28. The method of claim 27 further comprising:
    receiving an updated encrypted data set via an encrypted data set input which is communicatively coupled with said non-volatile memory component.

29. The method of claim 28 further comprising:
    utilizing a date comparison component to compare a date associated with said updated encrypted data set with a second date corresponding to a valid encrypted data set; and
    using said data blocking component to prevent said navigation data deriving component from accessing said updated encrypted data set when said date comparison component determines that said date associated with said updated encrypted data set does not match said second date corresponding to a valid encrypted data set.

30. The method of claim 28 further comprising:
    using a time comparison component to compare a time associated with said updated encrypted data set with a second time corresponding to a valid encrypted data set; and
    using said data blocking component to prevent said navigation data deriving component from accessing said updated encrypted data set when said time comparison component determines that said time associated with said updated encrypted data set does not match said second time corresponding to a valid encrypted data set.

31. The method of claim 28 wherein utilizing said data blocking component further comprises:
    utilizing an encryption key comparator for comparing a stored encryption key with an encryption key associated with said updated encrypted data set; and using said data blocking component to prevent a loading of said updated encrypted data set into said non-volatile memory component when said stored encryption key does not match said encryption key associated with said updated encrypted data set.

32. The method of claim 19 further comprising:
storing said data set comprising said unique identification of said transmission source and said known geographic position of said transmission source on said non-volatile memory component as a second encrypted data set.

33. An electronic device comprising:
a satellite navigation component configured to determine a geographic position of said electronic device;
a control component configured to determine that said satellite navigation component is not able to derive said geographic position within a specified parameter; and
an exclusion zone compliance circuit, said circuit comprising:
a terrestrial radio signal reception component of said exclusion zone compliance circuit configured for receiving a terrestrial radio signal, said terrestrial radio signal comprising a unique identification of a transmission source of said terrestrial radio signal;
a non-volatile memory component of said exclusion zone compliance circuit configured for storing an encrypted data set describing boundaries of an exclusion zone;
a navigation data deriving component of said exclusion zone compliance circuit communicatively coupled with said terrestrial radio signal reception component, said non-volatile memory, and with a data set comprising a station identification of said transmission source and a known geographic position of said transmission source, said navigation data deriving component configured for comparing said received unique identification of said transmission source with said station identification stored in said data set and for deriving a geographic position of said exclusion zone compliance circuit based upon said known geographic position of said transmission source and to determine whether said geographic position of said exclusion zone compliance circuit is located within said exclusion zone;
a data blocking component of said exclusion zone compliance circuit communicatively coupled with said non-volatile memory component and navigation data deriving component, said data blocking component configured for controlling access of said encrypted data set; and
a data control component of said exclusion zone compliance circuit configured for blocking output of a signal from said exclusion zone compliance circuit in response to an indication that said exclusion zone compliance circuit is located within said exclusion zone.

34. The electronic device of claim 33 wherein said non-volatile memory component is selected from the group consisting of a read-only memory component and a programmable memory component.

35. The electronic device of claim 33 wherein said data blocking component is configured to verify authenticity of said encrypted data set.

36. The electronic device of claim 33 wherein said data blocking component further comprises:
a verification data determining component configured for determining a verification data value based upon said encrypted data set; and
a verification data comparison component communicatively coupled with said verification data determining component, said verification data comparison component configured for comparing a second verification data value stored by said non-volatile memory component with said verification data value and wherein said data blocking component prevents said navigation data deriving component from accessing said encrypted data set when said verification data comparison component determines that said verification data value does not match said second verification data value.

37. The electronic device of claim 36 wherein said data blocking component further comprises:
a date comparison component configured for comparing a date associated with an updated encrypted data set with a second date corresponding to a valid encrypted data set and wherein said data blocking component is further configured for preventing said navigation data deriving component from accessing said updated encrypted data set when said date comparison component determines that said date associated with said updated encrypted data set does not match said second date corresponding to a valid encrypted data set; and
a time comparison component configured for comparing a time associated with said updated encrypted data set with a second time corresponding to a valid encrypted data set and wherein said data blocking component is further configured for preventing said navigation data deriving component from accessing said updated encrypted data set when said time comparison component determines that said time associated with said updated encrypted data set does not match said second time corresponding to a valid encrypted data set.

38. The electronic device of claim 33 wherein said data blocking component further comprises:
an encryption key comparator configured for comparing a stored encryption key with an encryption key associated with an updated encrypted data set and wherein said data blocking component is further configured for preventing a loading of said updated encrypted data set into said non-volatile memory component when said stored encryption key does not match said encryption key associated with said updated encrypted data set.

39. The electronic device of claim 33 wherein said electronic device comprises a cellular telephone and wherein said data control component controls a function of said cellular telephone.

40. The electronic device of claim 39 wherein said signal from said data control component prevents said cellular telephone from receiving a radio transmission.

41. The electronic device of claim 39 wherein said signal from said data control component prevents said cellular telephone from transmitting a radio signal.

42. The electronic device of claim 33 wherein said data control component is configured to output a signal which initiates disabling said circuit in response to determining that said circuit is located within said exclusion zone.

43. The electronic device of claim 33 wherein said data set comprising said unique identification of said transmission source and said known geographic position of said transmission source comprises a second encrypted data set which is stored on said non-volatile memory component.

44. A method for implementing exclusion zone compliance, said method comprising:
determining that a satellite navigation component disposed within an electronic device cannot derive a geographic position within a specified parameter;
in response to said determining, receiving a terrestrial radio signal with a terrestrial radio signal reception component of an exclusion zone compliance circuit, said terrestrial radio signal comprising a unique identification of a transmission source of said terrestrial radio signal;
accessing a data set disposed within said exclusion zone compliance circuit comprising a station identification of said transmission source and a known geographic position of said transmission source and comparing said received unique identification with said unique identification of said transmission source stored in said data set;

deriving a geographic position of said exclusion zone compliance circuit based upon said known geographic position of said transmission source;

utilizing a non-volatile memory component of said exclusion zone compliance circuit to store an encrypted data set describing boundaries of an exclusion zone;

utilizing a data blocking component of said exclusion zone compliance circuit communicatively coupled with said non-volatile memory component to control access of said encrypted data set; and utilizing a data control component of said exclusion zone compliance circuit to block output of a signal from said exclusion zone compliance circuit in response to an indication that said exclusion zone compliance circuit is located within said exclusion zone.

45. The method of claim 44, wherein said receiving a terrestrial radio signal with a terrestrial radio signal reception component of an exclusion zone compliance circuit, said terrestrial radio signal comprising a unique identification of a transmission source of said terrestrial radio signal comprises:

receiving a plurality of different types of terrestrial radio signals.

46. The method of claim 45, wherein said deriving a geographic position of said exclusion zone compliance circuit based upon said known geographic position of said transmission source comprises:

deriving said geographic position of said exclusion zone compliance circuit via a hybrid position determining approach.

47. The method of claim 44 wherein utilizing said non-volatile memory component further comprises:

utilizing a non-volatile memory component selected from the group consisting of a read-only memory component and a programmable memory component.

48. The method of claim 44 further comprising:
verifying authenticity of said encrypted data set.

49. The method of claim 44 wherein utilizing said data blocking component further comprises:

utilizing a verification data determining component for determining a verification data value based upon said encrypted data set;

utilizing a verification data comparison component communicatively coupled with said verification data determining component for comparing a second verification data value stored by said non-volatile memory component with said verification data value; and utilizing said data blocking component to prevent a navigation data deriving component from accessing said encrypted data set when said verification data comparison component determines that said verification data value does not match said second verification data value.

50. The method of claim 49 wherein utilizing said data blocking component further comprises:

utilizing a date comparison component for comparing a date associated with an updated encrypted data set with a second date corresponding to a valid encrypted data set; and using said data blocking component to prevent said navigation data deriving component from accessing said updated encrypted data set when said date comparison component determines that said date associated with said updated encrypted data set does not match said second date corresponding to a valid encrypted data set.

51. The method of claim 49 wherein utilizing said data blocking component further comprises:

using a time comparison component to compare a time associated with an updated encrypted data set with a second time corresponding to a valid encrypted data set; and using said data blocking component to prevent said navigation data deriving component from accessing said updated encrypted data set when said time comparison component determines that said time associated with said updated encrypted data set does not match said second time corresponding to a valid encrypted data set.

52. The method of claim 49 wherein utilizing said data blocking component further comprises:

utilizing an encryption key comparator for comparing a stored encryption key with an encryption key associated with an updated encrypted data set; and using said data blocking component to prevent a loading of said updated encrypted data set into said non-volatile memory component when said stored encryption key does not match said encryption key associated with said updated encrypted data set.

53. The method of claim 44 wherein said exclusion zone compliance circuit is disposed within a cellular telephone, said method further comprising:

controlling a function of said cellular telephone when said cellular telephone is within said exclusion zone.

54. The method of claim 53 further comprising:
blocking the reception by said cellular telephone of a radio transmission.

55. The method of claim 53 further comprising:
blocking the transmission by said cellular telephone of a radio signal.

56. The method of claim 44 further comprising:
storing said data set comprising said unique identification of said transmission source and said known geographic position of said transmission source on said non-volatile memory component as a second encrypted data set.

57. The method of claim 44, further comprising:
in response to said indication, selectively disabling operation of said exclusion zone compliance circuit.

* * * * *